United States Patent
Toumura et al.

(10) Patent No.: US 7,653,703 B2
(45) Date of Patent: Jan. 26, 2010

(54) COMPUTER SYSTEM WITH A PACKET TRANSFER DEVICE USING A HASH VALUE FOR TRANSFERRING A CONTENT REQUEST

(75) Inventors: Kunihiko Toumura, Hachioji (JP); Mikio Kataoka, Kokubunji (JP); Junji Yamamoto, Tokyo (JP); Toshiaki Suzuki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 590 days.

(21) Appl. No.: 11/411,071

(22) Filed: Apr. 26, 2006

(65) Prior Publication Data

US 2006/0248195 A1 Nov. 2, 2006

(30) Foreign Application Priority Data

Apr. 27, 2005 (JP) ............................... 2005-129182

(51) Int. Cl.
*G06F 15/16* (2006.01)
(52) U.S. Cl. ........................................ 709/217; 709/203
(58) Field of Classification Search ................ 709/217, 709/238, 203, 200–202, 223, 226, 218–222, 709/224–225, 227
See application file for complete search history.

(56) References Cited

U.S. PATENT DOCUMENTS

| | | | | |
|---|---|---|---|---|
| 5,924,116 A | * | 7/1999 | Aggarwal et al. ........... 711/122 |
| 6,532,492 B1 | * | 3/2003 | Presler-Marshall .......... 709/223 |
| 7,025,209 B2 | * | 4/2006 | Hawkins ..................... 209/217 |
| 7,035,911 B2 | * | 4/2006 | Lowery et al. .............. 709/217 |
| 7,146,429 B2 | * | 12/2006 | Michel ....................... 709/238 |
| 7,171,439 B2 | * | 1/2007 | Honig ........................ 709/200 |

(Continued)

FOREIGN PATENT DOCUMENTS

JP 2005-010970 1/2005

OTHER PUBLICATIONS

RFC0793, Transmission Control Protocol, Darpa Internet Program Protocol Specification, Sep. 1981. pp. 1-46.

(Continued)

*Primary Examiner*—Moustafa M Meky
(74) *Attorney, Agent, or Firm*—Brundidge & Stanger, P.C.

(57) ABSTRACT

An object of this invention is to reduce a calculation amount and required storage capacity of a URL switch by dividing transfer destination determining processing among a plurality of devices. Provided is a computer system including: a plurality of servers; and a packet transfer device, in which: the servers are coupled to the packet transfer device; the packet transfer device is coupled to a client terminal via a network; the packet transfer device receives a content request including a fixed-length hash value that is calculated from a variable-length identifier of the content requested by the client terminal; extracts the hash value from the received content request; and determines, based on the extracted hash value, to which one of the plurality of servers the content request is to be transferred.

13 Claims, 25 Drawing Sheets

U.S. PATENT DOCUMENTS

| | | | |
|---|---|---|---|
| 7,225,219 B2 * | 5/2007 | Giacomini et al. | 709/200 |
| 7,296,076 B1 * | 11/2007 | Portolani | 709/227 |
| 7,406,512 B2 * | 7/2008 | Swildens et al. | 709/219 |
| 7,519,677 B2 * | 4/2009 | Lowery et al. | 709/212 |
| 7,552,235 B2 * | 6/2009 | Chase et al. | 709/238 |
| 2004/0260769 A1 | 12/2004 | Yamamoto et al. | |
| 2005/0144317 A1 * | 6/2005 | Chase et al. | 709/238 |
| 2006/0248452 A1 * | 11/2006 | Lambert et al. | 715/513 |

OTHER PUBLICATIONS

"Hypertext Transfer Protocol", R. Fielding, et al. RFC2616, Jun. 1999. pp. 1-114.

"Using Signatures to Improve URL Routing" by Z. Genova, et al. pp. 45-52. 2002 IEEE.

* cited by examiner

| HASH VALUE | TRANSFER DESTINATION |
|---|---|
| 0x12345678 | WEB SERVER 1 (IP: 192.168.0.1) |
| 0x23456789 | WEB SERVER 1 (IP: 192.168.0.1) |
| 0x3456789A | WEB SERVER 2 (IP: 192.168.0.2) |
| .... | .... |

TRANSFER DESTINATION SELECTION TABLE

FIG. 5

CONTENT REQUEST PACKET FROM CLIENT

```
GET /index.html HTTP/1.1
Host: www.example.com
X-Hash: 0123ABCD
Referer: http://www.example.com/
```

EXTRACTED HASH VALUE: 0123ABCD

FIG. 6

| URL | CONTENT |
|---|---|
| http://www.example.com/ | <html><head>....</head><body>....</body></html> |
| http://www.example.com/image/test.gif | GIF IMAGE DATA |
| http://www.example.com/about.html | <html><head>....</head><body>....</body></html> |
| .... | .... |

CONTENT DB
1110

*FIG. 12*

|  | 12081 | 12082 |
|---|---|---|
| | HASH VALUE | TRANSFER DESTINATION |
| | 0x12345678 | CONTROL SERVER 1 (IP: 192.168.0.1) |
| | 0x23456789 | CONTROL SERVER 1 (IP: 192.168.0.1) |
| | 0x3456789A | CONTROL SERVER 2 (IP: 192.168.0.2) |
| | ..... | ..... |

TRANSFER DESTINATION SELECTION TABLE

| 13051 | 13052 |
|---|---|
| URL | CACHE SERVER |
| http://www.example.com/ | CACHE SERVER 1 (IP: 192.168.2.1) |
| http://www.example.com/image/test.gif | CACHE SERVER 1 (IP: 192.168.2.1) |
| http://www.example.net/top.gif | CACHE SERVER 2 (IP: 192.168.3.1) |
| .... | .... |

CACHE LOCATION DB

CONTENT REQUEST PACKET FROM CLIENT

```
GET /index.html HTTP/1.1
Host: www.example.com
Referer: http://www.example.com/
```

↓

EXTRACTED URL : http://www.example.com/index.html

FIG. 17

CONTENT REQUEST PACKET FROM CACHE SERVER

GET /index.html HTTP/1.1
Host: www.example.com
X-Hash: 0123ABCD
Referer: http://www.example.com/

EXTRACTED HASH VALUE: 0123ABCD

EXTRACTED URL: http://www.example.com/index.html

COMPUTER SYSTEM WITH A PACKET TRANSFER DEVICE USING A HASH VALUE FOR TRANSFERRING A CONTENT REQUEST

CLAIM OF PRIORITY

The present application claims priority from Japanese patent application P2005-129182 filed on Apr. 27, 2005, the content of which is hereby incorporated by reference into this application.

BACKGROUND OF THE INVENTION

This invention relates to a computer system with a packet transfer device, in particular, a transfer control using a URL switch.

Various services provided on the Internet are mostly implemented by way of TCP, which is a stream type communication protocol (refer to IETF, RFC 793, "Transmission Control Protocol", September 1981). World-Wide Web, for example, employs a variation of TCP, Hypertext Transport Protocol (HTTP, refer to IETF, RFC 2616, "Hypertext Transfer Protocol—HTTP/1.1", June 1999).

In HTTP, content is obtained from a server through the following procedure. First, a client terminal establishes a TCP connection with the server. A URL of the requested content is contained at a head of a stream. The server interprets the URL to recognize which content is requested by the user, and returns the content located at the recognized URL to the client terminal.

A server in a large-scale system needs to process requests from many users.

One way to deal with a large amount of processing is to balance the processing load among a plurality of servers. In this case, a load balancer is placed on a communication route between the servers and the client terminals, and distributes the load of processing the requests from the users. The load balancer (URL switch) determines a transfer destination of the content by recognizing a URL that is requested by a client terminal.

The URL switch operates as follows.

The URL switch terminates a TCP connection, which is otherwise established by a client terminal to a server. The URL switch extracts a URL of the content sent by the client terminal, and determines from the extracted URL a transfer destination of the content.

For instance, a URL switch serving as a load balancer chooses one of a plurality of servers that stores content requested by a client terminal. The URL switch sets a connection with the chosen server, and transfers the request from the client terminal. The URL switch subsequently relays packets that are to be exchanged between the client terminal and the server.

Through such operation, a URL switch transfers a request from a client terminal to an appropriate server.

SUMMARY OF THE INVENTION

A first feature of the URL switch operation is to extract a URL from a received request. A second feature is to determine a transfer destination through a table search (or some form of calculation) that uses the extracted URL as a key. To speed up the transfer destination determining processing performed by the URL switch, the above two processing steps have to be made quicker.

In a conventional method, a URL switch extracts a URL from a request and uses the URL as a key in determining a transfer destination. A URL contained in a request from a client terminal has a variable, unfixed length and, in general, has a size of about 50 bytes. Extracting this size of URL and searching a table (or calculating) based on the extracted URL requires a great deal of processing ability and storage capacity. In short, it is difficult with the conventional method to achieve speedy and economical processing.

There has been also proposed a method of using a hash value of a URL as a table search key in order to reduce a size of a table kept by a URL switch (see Z. Genova and K. Christensen, "Using signatures to improve URL routing," In Proceedings of IEEE International Performance, Computing, and Communications Conference, April 2002, p. 45-52). According to this method, a URL switch extracts a URL from a request packet, calculates a hash value from the extracted URL, and searches a table with the hash value as a key.

It is an object of this invention to reduce a calculation amount and required storage capacity of a URL switch by dividing transfer destination determining processing among a plurality of devices.

According to a representative aspect of this invention, there is provided a computer system including: a plurality of servers; and a packet transfer device, in which: the servers are coupled to the packet transfer device; the packet transfer device is coupled to a client terminal via a network; the packet transfer device receives a content request including a fixed-length hash value that is calculated from a variable-length identifier of the content requested by the client terminal; extracts the hash value from the received content request; and determines, based on the extracted hash value, to which one of the plurality of servers the content request is to be transferred.

In a computer system according to an embodiment of this invention, a client terminal creates a fixed-length value from a URL of content that the client terminal requests, includes this value in a request, and sends the request. A URL switch extracts the fixed-length value contained in the request, and determines from the extracted value which processing is requested.

This invention simplifies processing executed by the URL switch and thus improves performance of the URL switch. With the processing of the URL switch quickened, applications that use the URL switch can operate faster, and users can receive services of higher quality.

BRIEF DESCRIPTION OF THE DRAWINGS

The present invention can be appreciated by the description which follows in conjunction with the following figures, wherein:

FIG. 5 is an explanatory diagram of a transfer destination selection table according to the first embodiment;

FIG. 6 is an explanatory diagram of a content request packet according to the first embodiment;

FIG. 12 is an explanatory diagram of a content database according to the second embodiment;

FIG. 14 is an explanatory diagram of a transfer destination selection table according to the second embodiment;

FIG. 16 is an explanatory diagram of a cache location database according to the second embodiment;

FIG. 17 is an explanatory diagram of a content request packet that is sent from a client terminal according to the second embodiment;

DETAILED DESCRIPTION OF THE PREFERRED EMBODIMENTS

This specification describes embodiments in which this invention is applied to load balancing of Web servers.

For Web server load balancing, content requests made to the same site are distributed among a plurality of servers and processed separately, so that the load per server is reduced and the response time is shortened. Each server takes a part in providing content and, in embodiments of this invention, which server works for the request is determined from a hash value.

In a conventional computer system that contains a URL switch, the URL switch extracts a URL from a content request packet and calculates a hash value of the extracted URL to determine a transfer destination the content request. In embodiments of this invention, a client terminal or the like shares the burden of the hash value calculation to simplify URL extraction processing in a URL switch.

There are various hash functions used to calculate a hash value. MD5, for example, is for calculating a 128-bit hash value from data of arbitrary length, and has a wide range of uses including data authentication on the Internet. A description about MD5 can be found in IETF, RFC 1321, "The MD5 Message-Digest Algorithm".

CRC32 is for calculating a 32-bit hash value from data of arbitrary length, and is used mainly for data error detection. A description about CRC 32 can be found in ISO, IS 3309, "ISO Information Processing Systems-Data communication High-Level Data Link Control Procedure-Frame Structure".

First Embodiment

Figure 1:
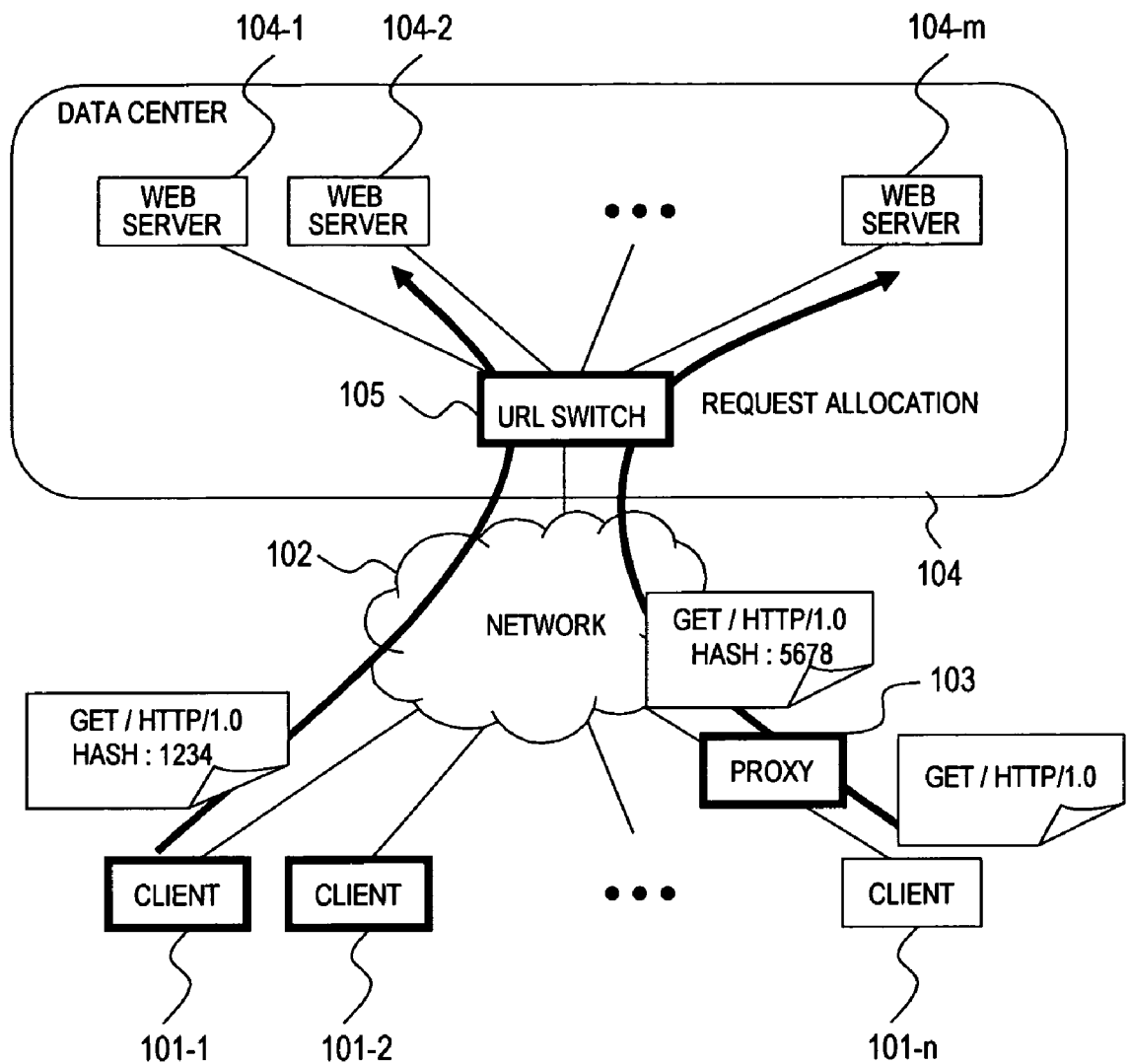
FIG. 1 is a block diagram of a computer system according to a first embodiment.

FIG. 1 is a block diagram showing a configuration of a computer system according to a first embodiment.

The computer system of the first embodiment is composed of client terminals 101-1 to 101-n, a network 102, and a server group 104.

The server group 104 includes a plurality of Web servers 104-1 to 104-m and a URL switch 105. The Web servers 104-1 to 104-m are computers for providing content to the client terminals 101-1 to 101-n. The URL switch 105 is a load balancer for analyzing content requests (URLs) sent from the client terminals 101-1 to 101-n and allocates the content requests to the Web servers 104-1 to 104-m.

The network 102 connects the client terminals 101-1 to 101-n to the server group 104, and employs as a communication protocol TCP/IP, for example.

The client terminals 101-1 to 101-n are computers for requesting content from the Web servers 104-1 to 104-m by way of HTTP. A proxy server 103 is provided between the client terminal 101-n and the network 102. The client terminals 101-1 to 101-(n−1) may also have proxy servers placed between themselves and the network 102.

In this embodiment, a hash value of a URL is contained in a content request that follows HTTP as will be described later. The URL switch 105 determines a transfer destination of a content request based on a hash value that is contained in the content request.

Figure 2:
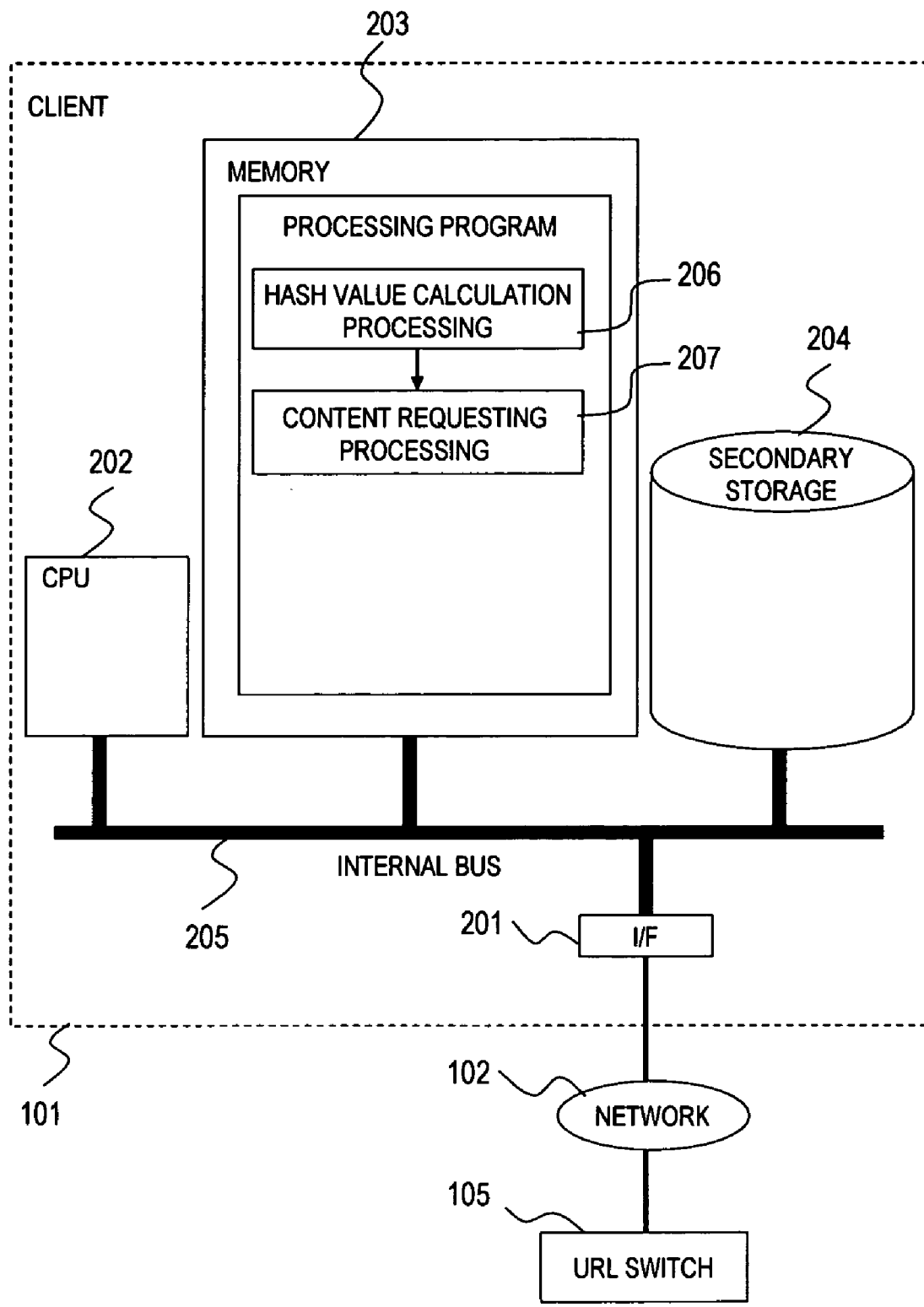
FIG. 2 is a block diagram of a client terminal according to the first embodiment.

FIG. 2 is a block diagram showing a configuration of the client terminal 101-1 according to the first embodiment. The configuration of the client terminal 101-1 shown in FIG. 2 is shared by other client terminals 101-2 to 101-n.

The client terminal 101-1 is a computer that is equipped with a network interface 201, a CPU 202, a memory 203, and secondary storage 204. Those components of the client terminal 101-1 are interconnected by an internal bus 205.

The network interface 201 is connected to the network 102, and enables the client terminal 101-1 to exchange data and control signals with the URL switch 105 via the network 102. The client terminal 101-1 shown in FIG. 2 has one network interface but may have two or more network interfaces.

The CPU 202 executes various programs stored in the memory 203 to control the client terminal 101-1.

The memory 203 stores a processing program that contains a hash value calculation processing sub-program 206 and a content requesting sub-program 207.

The hash value calculation processing sub-program 206 calculates a fixed-length hash value of a URL designated by a content request with the use of, for example, CRC 32. The content requesting sub-program 207 creates a content request that contains a hash value calculated by the hash value calculation processing sub-program 206.

When the proxy server 103 is placed along a route from the client terminal 101-1 to the Web servers 104-1 to 104-m and the hash value is calculated in the proxy server 103 as is the case for the client terminal 101-n, the memory 203 does not need to store the hash value calculation processing sub-program 206.

The secondary storage 204 is a hard disk drive that keeps stored data after the client terminal 101-1 is powered off.

Figure 3:
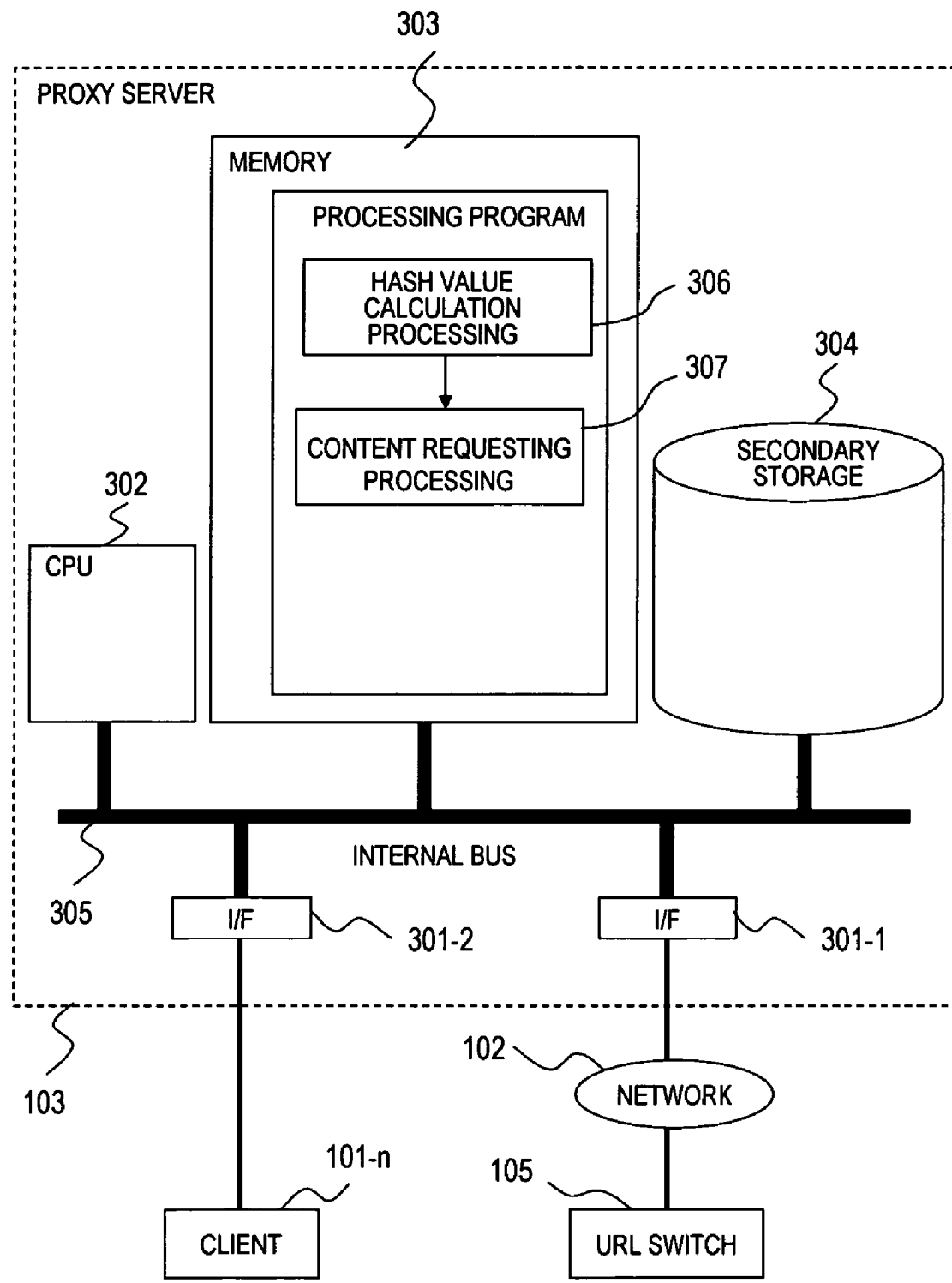
FIG. 3 is a block diagram of a proxy server according to the first embodiment.

FIG. 3 is a block diagram showing a configuration of the proxy server 103 according to the first embodiment.

The proxy server 103 is a computer that is equipped with a network interfaces 301-1 and 301-2, a CPU 302, a memory 303, and secondary storage 304. Those components of the proxy server 103 are interconnected by an internal bus 305.

The network interface 301-1 is connected to the network 102, and the network interface 301-2 is connected to the client terminal 101-n.

The CPU 302 executes various programs stored in the memory 303 to control the proxy server 103.

The memory 303 stores a processing program that contains a hash value calculation processing sub-program 306 and a content requesting sub-program 307.

The hash value calculation processing sub-program 306 calculates a fixed-length hash value based on a URL designated by a content request sent from the client terminal 101-n. The content requesting sub-program 307 creates a content request that contains a hash value calculated by the hash value calculation processing sub-program 306.

The secondary storage 304 is a hard disk drive that keeps stored data after the proxy server 103 is powered off.

Figure 4:
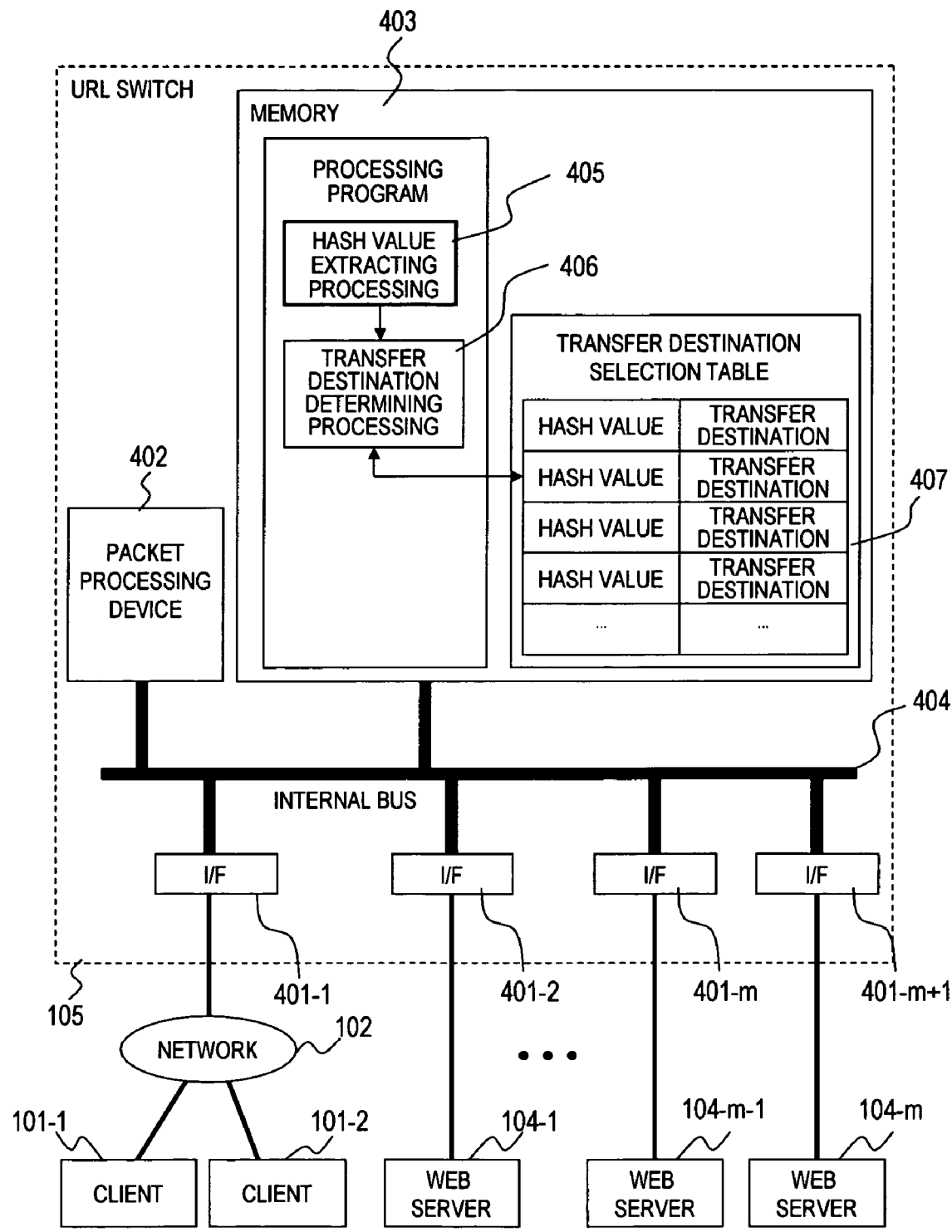
FIG. 4 is a block diagram of a URL switch according to the first embodiment.

FIG. 4 is a block diagram showing a configuration of the URL switch 105 according to the first embodiment.

The URL switch 105 is a computer that is equipped with network interfaces 401-1 to 401-m+1, a packet processing device 402, and a memory 403. Those components of the URL switch 105 are interconnected by an internal bus 404.

The network interface 401-1 is connected to the network 102, and the network interfaces 401-2 to 401-m+1 are connected to the Web servers 104-1 to 104-m.

The packet processing device 402 is a network processor for transferring an inputted packet to a given address.

The memory 403 stores a processing program that contains a hash value extracting processing sub-program 405 and a transfer destination determining processing sub-program 406. The memory 403 is provided with a buffer for temporarily storing packets sent and received by the URL switch 105. The memory 403 also stores a transfer destination selection table 407.

The hash value extracting processing sub-program 405 extracts a hash value from content requests sent by the client terminals 101-1 to 101-n. The transfer destination determining processing sub-program 406 uses the hash value that is extracted by the hash value extracting processing sub-program 405 as a key in searching the transfer destination selection table 407 to determine a transfer destination of a content request.

The transfer destination selection table 407 holds the association between a hash value and a transfer destination.

FIG. 5 is an explanatory diagram of a configuration of the transfer destination selection table 407 according to the first embodiment.

The transfer destination selection table 407 contains a hash value 4071 of a URL and an IP address 4072 of a transfer destination Web server.

The URL hash value 4071 indicates a fixed-length hash value that is calculated from a URL designated by a content request. The transfer destination 4072 indicates the IP address of a Web server that is associated with the URL from which the hash value is calculated. In other words, the transfer destination 4072 indicates the IP address of a Web server to which the content request containing this hash value is transferred.

The URL switch 105 uses a hash value contained in a content request that is received from the client terminal 101 as a key in searching the transfer destination selection table 407, and thus identifies to which Web server the content request is to be transferred.

FIG. 6 is an explanatory diagram of a content request packet according to the first embodiment.

An X-Hash header is attached to a content request packet sent from the client terminal 101-1. The X-Hash header stores a hash value (for example, 0123ABCD) of a URL in question.

Receiving the content request packet, the URL switch 105 extracts the hash value from the X-Hash header to determine a transfer destination of the content request packet.

A procedure of requesting content will be described next.

Figure 7:
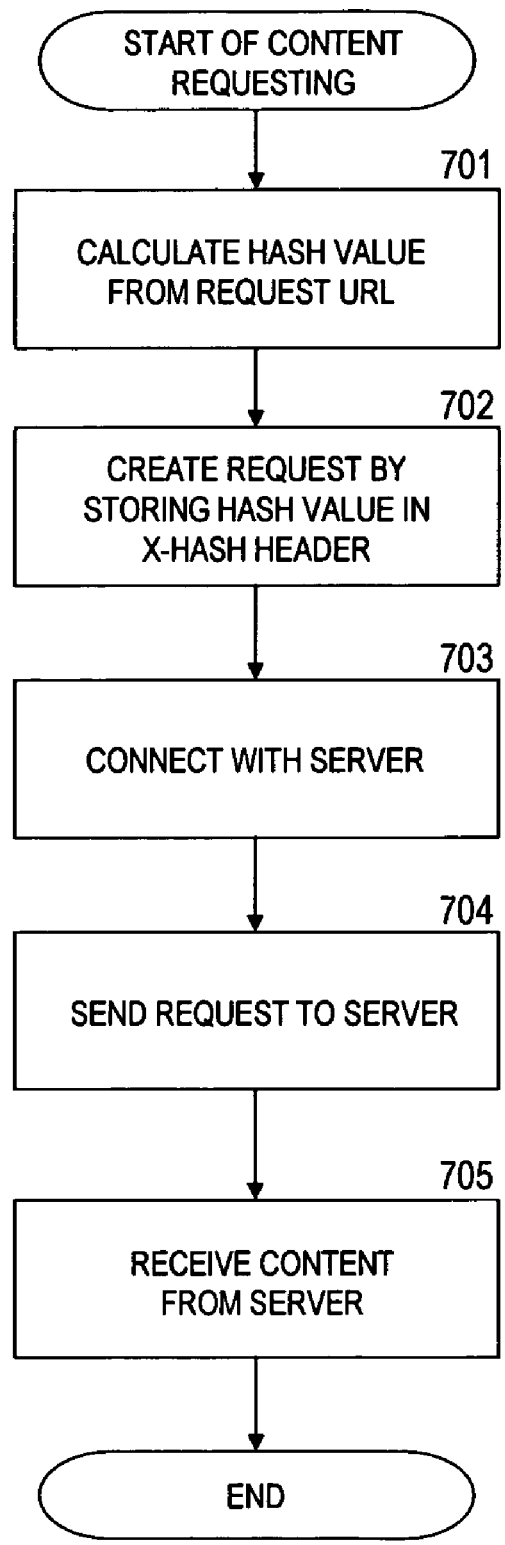
FIG. 7 is a flow chart for content requesting processing that is executed by the client terminal according to the first embodiment.

FIG. 7 is a flow chart for content requesting processing that is executed by the client terminal 101 according to the first embodiment.

Once a URL at which requested content is located is determined, the client terminal 101 uses the hash value calculation processing sub-program 306 to calculate a hash value of the URL (Step 701).

The client terminal 101 stores the calculated hash value in the header (X-Hash header) of a content request to create a content request packet (Step 702).

The client terminal 101 next establishes a session with the Web servers 104-1 to 104-m (Step 703). To be specific, the client terminal 101 activates the connection with the URL switch 105 and establishes a session with the URL switch 105.

The client terminal 101 then sends the content request packet created in Step 702 to the URL switch 105 (Step 704). The client terminal 101 receives the requested content via the URL switch 105 from the Web servers 104-1 to 104-m (Step 705).

Figure 8:
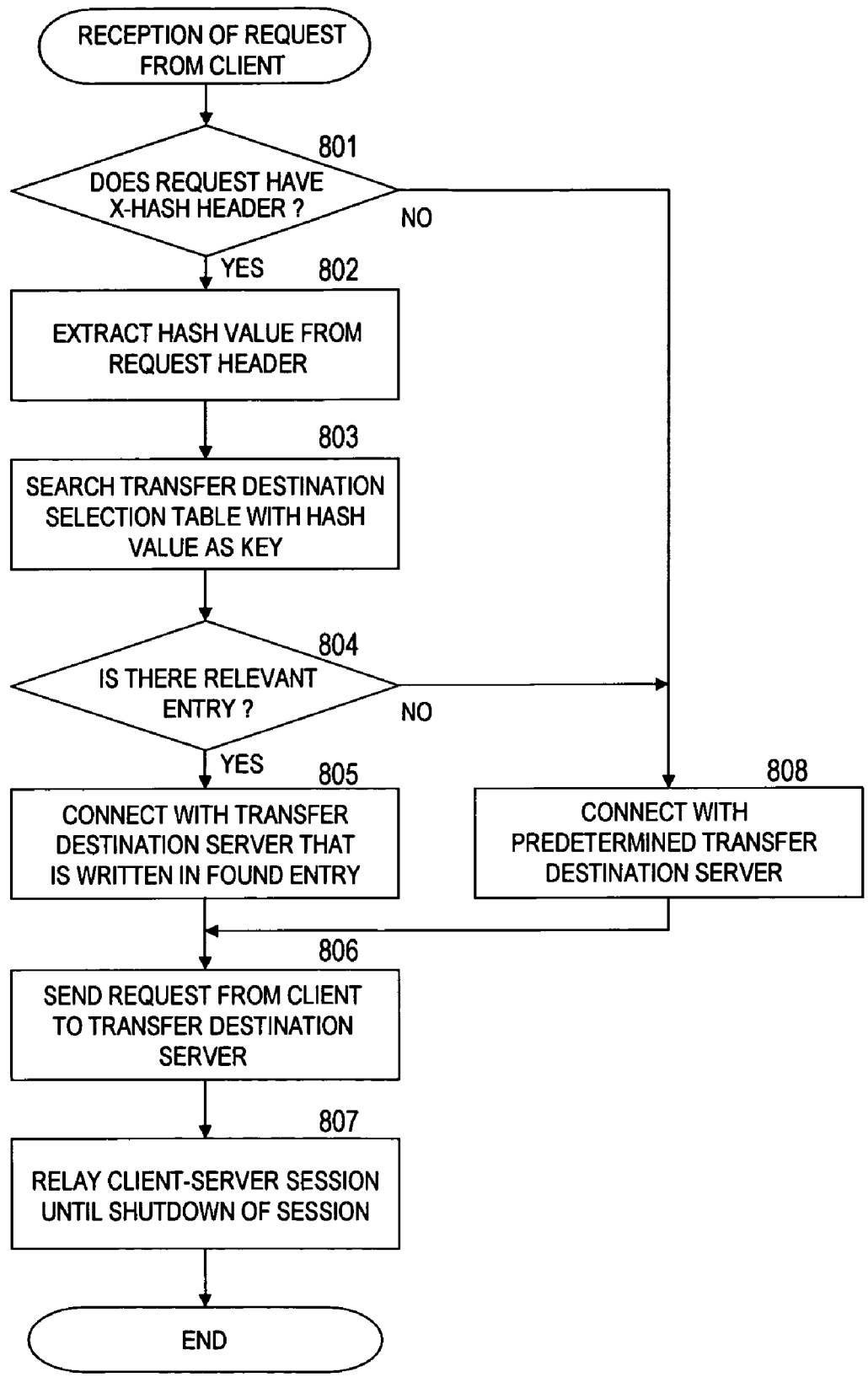
FIG. 8 is a flow chart for session relaying processing which is executed by the URL switch according to the first embodiment.

FIG. 8 is a flow chart for session relaying processing which is executed by the URL switch 105 according to the first embodiment. The URL switch 105 executes the session relaying processing upon receiving content requests from the client terminals 101-1 to 101-n.

The URL switch 105 receives a content request packet from the client terminal 101, for example, the client terminal 101-1, and judges whether the content request packet has an X-Hash header or not (Step 801).

Finding that the content request packet has an X-Hash header, the URL switch 105 extracts a hash value from the X-Hash header (Step 802). This hash value extracting processing is simpler than extracting a URL since the processing of extracting a fixed-length value (hash value) is simpler than the processing of extracting a character string of variable length (URL).

With the extracted hash value as a key, the URL switch 105 searches the transfer destination selection table 407 (Step 803) and judges whether or not the table has a relevant entry (Step 804).

In the case where the relevant entry is found, the URL switch 105 determines the Web server 104 that is indicated by the transfer destination 4072 of this entry, for example, the Web server 104-1, as the transfer destination, and establishes a session with the Web server 104-1 (Step 805).

The URL switch 105 then sends the content request made by the client terminal 101-1 to the transfer destination Web server 104-1 (Step 806).

The URL switch 105 relays the session between the client terminal 101-1 and the Web server 104-1 until the session is shut down (Step 807).

When the content request packet does not have an X-Hash header in Step 801, or when a relevant entry is not found in Step 804, the URL switch 105 designates a Web server that is determined in advance as the transfer destination, and establishes a session with this Web server (Step 808). The URL switch 105 then sends the content request made by the client terminal 101-1 to the transfer destination server (Step 806).

Receiving the content request that contains no X-Hash header, the Web server obtains a hash value from the URL sent by the client terminal 101-1, and transfers the content request to an appropriate Web server. In this case, the predetermined Web server, too, has the transfer destination selection table 407 shown in FIG. 5, and searches the transfer destination selection table 407 for an appropriate Web server. This way, the load can be balanced properly despite a content request made by the client terminal 101 that is not capable of attaching an X-Hash header. The predetermined Web server may transfer the content request to an appropriate Web server by analyzing the URL through the usual procedure.

The URL switch 105 relays a session in this manner to transfer a content request from the client terminal 101 to an appropriate server 104.

Figure 9:
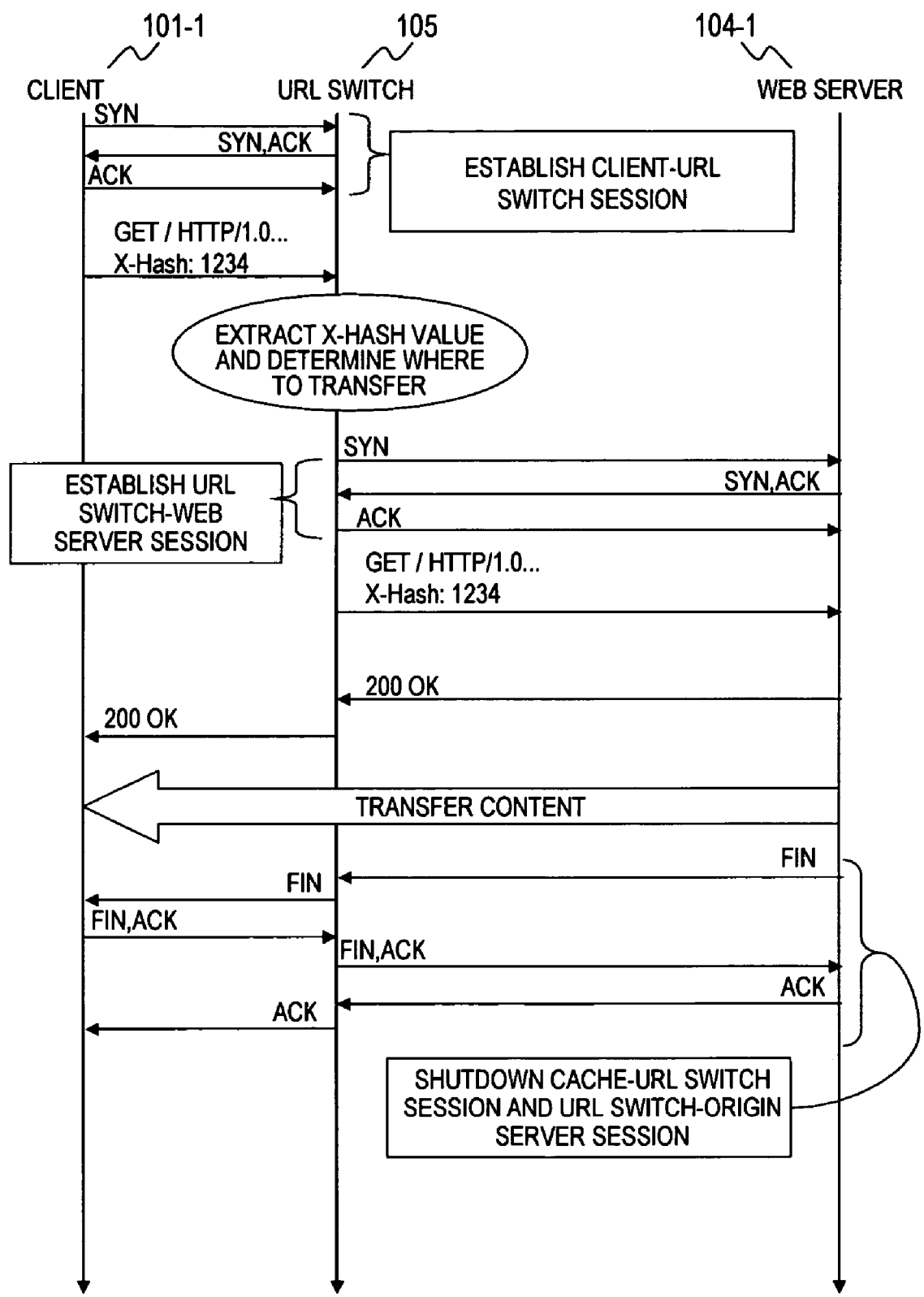
FIG. 9 is a sequence diagram for content transfer according to the first embodiment.

FIG. 9 is a sequence diagram of content transfer according to the first embodiment.

The client terminal 101, for example, the client terminal 101-1, performs a TCP 3-way handshake in order to establish a session with the URL switch 105 (Step 703 of FIG. 7).

To be specific, the client terminal 101-1 sends a SYN packet to the URL switch 105 requesting the URL switch 105 to establish a session between the client terminal 101-1 and the URL switch 105. Receiving the SYN packet, the URL switch 105 sends a SYN packet and an ACK packet to the client terminal 101-1 when it is possible to establish the session. In response to the SYN and ACK packets, the client terminal 101-1 sends an ACK packet. The session between the client terminal 101-1 and the URL switch 105 is established through this packet exchange.

The client terminal 101-1 then sends a content request packet (Step 704 of FIG. 7). The URL switch 105 receives the content request packet and extracts a hash value from the received packet (Step 802 of FIG. 8) to determine a transfer destination of the packet (Step 803 of FIG. 8).

A session is now established between the URL switch 105 and the Web server 104 that has been determined as the transfer destination, for example, the Web server 104-1 (Step 805). The URL switch 105 then sends the content request packet from the client terminal 101-1 to the Web server 104-1 with which the session has been established (Step 806 of FIG. 8).

The Web server 104-1 receives the content request packet and sends an OK packet in return. The URL switch 105 transfers the OK packet sent by the Web server 104-1 to the client terminal 101-1. The Web server 104-1 sends the requested content.

After finishing the transmission of the requested content, the Web server 104-1 sends a FIN packet to request an end to the session. The URL switch 105 transfers the FIN packet sent by the Web server 104-1 to the client terminal 101-1.

Receiving the FIN packet, the client terminal 101-1 ends the session with the Web server 104-1, and sends a FIN packet and an ACK packet. The Web server 104-1 receives the FIN and ACK packets, and sends an ACK packet in return. The session between the client terminal 101-1 and the Web server 104-1 is ended through this packet exchange.

As described above, in the first embodiment, the identifier extraction and arithmetic processing in a URL switch are simplified by having a client terminal extract a hash value from a URL. This reduce the count and cost programs needed to be loaded in the URL switch, and thus makes quick load balancing possible.

The first embodiment simplifies URL extracting processing which constitutes a part of processing of determining a transfer destination of a content request from a client terminal. To simplify the URL extracting processing, the client terminal creates a fixed-length hash value from a URL and includes the obtained value in a content request. This changes the value to be extracted by a URL switch from a long, variable-length string of characters to a short, fixed-length string of characters, thereby lessening the processing burden of the URL switch.

The use of a hash value, instead of a URL, by the URL switch in transfer destination determining processing also reduces the amount of data handled by the URL switch from about 50 bytes to a few bytes. The required storage capacity of the URL switch can thus be reduced.

Second Embodiment

Described next is an example of applying this invention to a computer system that has a distributed cache.

A cache server is placed between a client terminal and a content server (origin server). The cache server responds to a content request made by the client terminal in place of the content server, to thereby cut short the time required to respond to the client terminal, lessen the load on the content server, and reduce traffic between the cache server and the content server.

A cache server housing more client terminals stores more common content requested by a plurality of client terminals, and the cache hit ratio is accordingly improved.

However, the cache server may receive more content requests from that many client terminals than it is capable of processing, thus causing a bottleneck. The cache server bottleneck can be avoided while the amount of stored content is increased by dividing client terminals among a plurality of cache servers and sharing cached content among the cache servers.

There are two possible ways to implement such distributed caching.

One is to exchange, through direct communications between distributed cache servers, information on each other's cached content. This method is described, in detail, as Internet Cache Protocol, in RFC 2186, "Internet Cache Protocol (ICP)".

The other is to have a control server manage information on cached content in a centralized manner and give each cache server an instruction in obtaining content. This type of distributed cache control is described in, for example, JP 2005-10970 A.

In the first method, more cache servers communicate with each other than in the second method. In other words, communications between cache servers in the first method increase in proportion to the square of the count of cache servers. The first method therefore has low scalability.

In the second method, the control server is flooded with inquiries about whether particular content is cached or not. To solve this, a dedicated instrument utilizing a URL switch takes over a part of processing of the control server and offloads the control server. The instrument, for example, a network processor, specializes in packet processing to enhance the efficiency of packet processing.

However, an instrument specialized for packet processing can only perform limited processing on packets. For instance, such an instrument can quickly extract fixed-length information that is located in a specific location but cannot handle a variable-length character string such as a URL quickly enough.

A second embodiment of this invention solves this by burying a hash value in a content request packet sent from a cache server to the control server. An instrument specialized for packet processing can thus perform, at high speed, processing equivalent to URL analysis.

CRC32 is used to calculate a hash value of a URL in the second embodiment as in the first embodiment.

Figure 10:
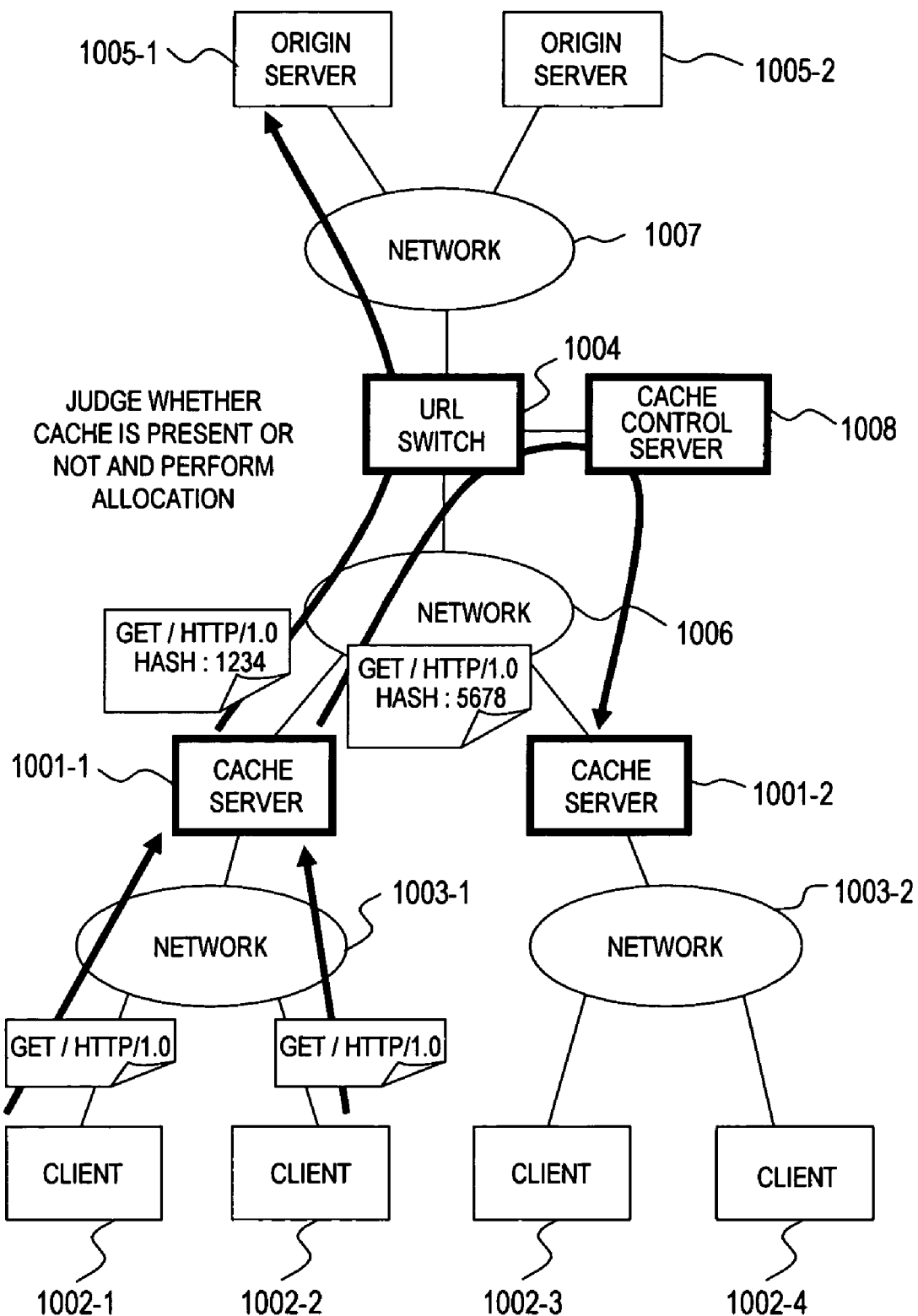
FIG. 10 is a block diagram of a computer system according to a second embodiment.

FIG. 10 is a block diagram showing a configuration of a computer system according to the second embodiment.

The computer system of the second embodiment is composed of cache servers 1001-1 and 1001-2, client terminals 1002-1 to 1002-4, networks 1003-1 and 1003-2, a URL switch 1004, origin servers 1005-1 and 1005-2, a network 1006, a network 1007, and a cache control server 1008.

The client terminals 1002-1 to 1002-4 are computers for requesting content from the origin servers 1005-1 and 1005-2 by way of HTTP. The client terminals 1002-1 to 1002-4 has the same configuration as that of the client terminals 101-1 to 101-n described in the first embodiment with reference to FIG. 2.

The cache servers 1001-1 and 1001-2 store content obtained by the client terminals 1002-1 to 1002-4 from the origin servers 1005-1 and 1005-2.

The URL switch 1004 is a load balancer that analyzes content request packets sent from the client terminals 1002-1 to 1002-4 to judge whether or not a cache is stored, and allocates the content requests accordingly. In the computer system of the second embodiment where a hash value of a URL is contained in a content request packet, the URL switch 1004 uses the hash value of the URL in judging the presence or absence of a cache.

The origin servers 1005-1 and 1005-2 are computers for providing content to the client terminals 1002-1 to 1002-4.

The cache servers 1001-1 and 1001-2 are each connected to one or more of the client terminals 1002-1 to 1002-4 via the network 1003-1 or 1003-2. The cache servers 1001-1 and 1001-2 are connected to the URL switch 1004 via the network 1006. The URL switch 1004 is connected to the origin servers 1005-1 and 1005-2 via the network 1007. The cache control server 1008 is connected to the URL switch 1004. The networks 1003-1 and 1003-2 and the networks 1006 and 1007 employ TCP/IP, for example, as a communication protocol.

Figure 11:
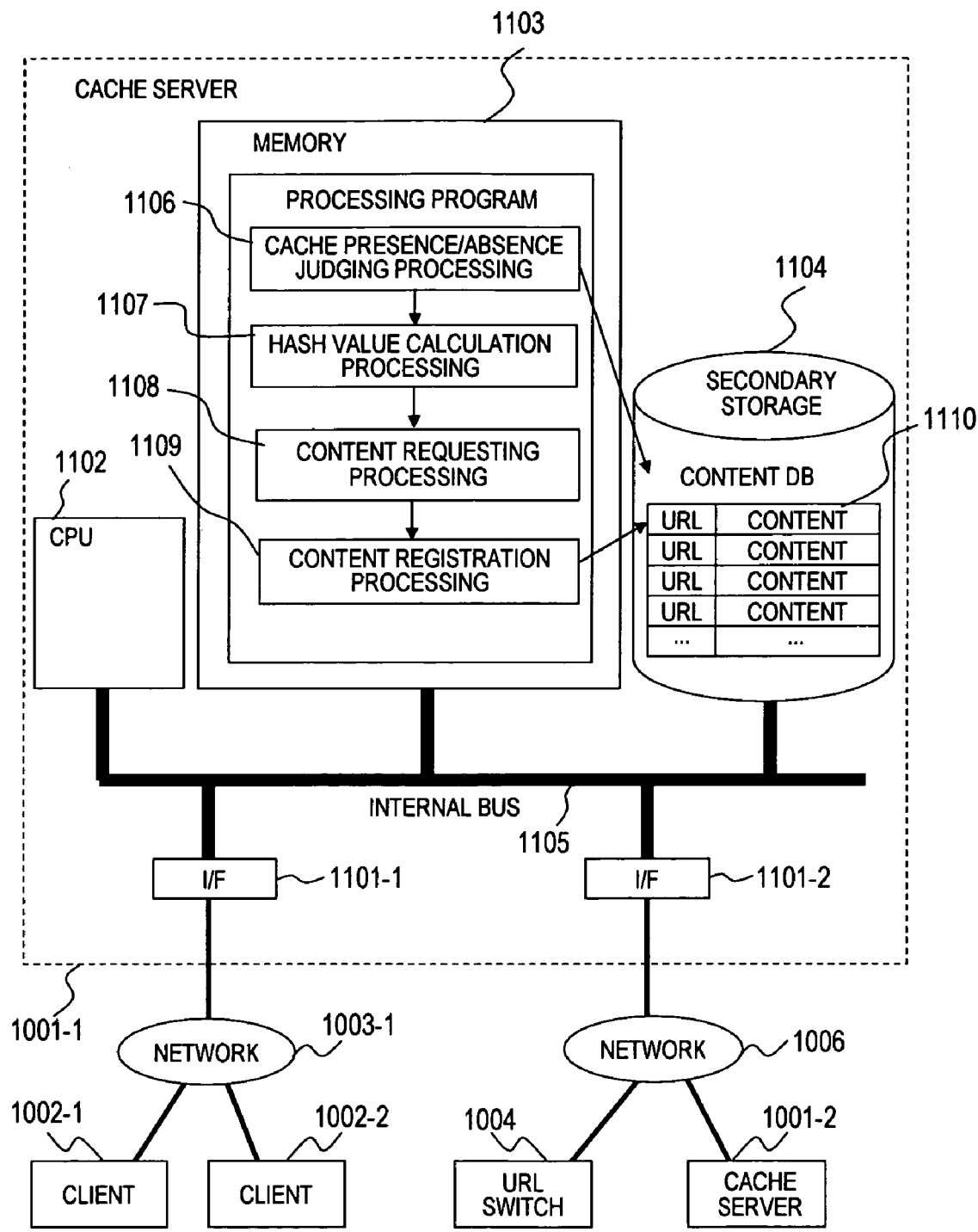
FIG. 11 is a block diagram of a cache server according to the second embodiment.

FIG. 11 is a block diagram showing a configuration of the cache server 1001-1 according to the second embodiment. The configuration of the cache server 1001-1 shown in FIG. 11 is shared by the other cache server 1001-2.

The cache server 1001-1 is a computer that is equipped with interfaces 1101-1 and 1101-2, a CPU 1102, a memory 1103 and secondary storage 1104. Those components of the cache server 1001-1 are interconnected by an internal bus 1105.

The interface 1101-1 is connected to the network 1003-1. The interface 1101-2 is connected to another cache server and a URL switch.

The CPU 1102 executes various programs stored in the memory 1103 to control the cache server.

The memory 1103 stores a processing program that contains a cache presence/absence judging processing sub-program 1106, a hash value calculation processing sub-program 1107, a content requesting processing sub-program 1108, and content registration processing sub-program 1109.

The cache presence/absence judging processing sub-program 1106 searches a content database 1110 stored in the secondary storage 1104, and judges whether or not its own cache server 1001-1 stores content requested by a user.

The hash value calculation processing sub-program 1107 calculates a fixed-length hash value from a URL that is designated in a content request sent from the client terminal 1002-1 or 1002-2.

The content requesting processing sub-program 1108 requests content from the cache control server 1008 when the content requested by the client terminal 1002-1 or 1002-2 is not stored in its own cache server 1001-1.

The content registration processing sub-program 1109 obtains content from the origin servers 1005-1 and 1005-2 via the URL switch 1004, or directly from the other cache server 1001-2. The content registration processing sub-program 1109 stores the obtained content in the content database 1110 of its own cache server 1001-1.

The secondary storage 1004 is a hard disk drive that keeps stored data after the cache server 1001-1 is powered off, and stores the content database 1110.

The content database 1110 holds the association between content and the URL of the content.

FIG. 12 is an explanatory diagram of a configuration of the content database 1110 according to the second embodiment.

The content database 1110 contains a URL 11101 and content 11102.

The URL 11101 indicates a URL at which requested content is stored in an origin server. Stored as the content 11102 is data itself of the content.

The cache server 1001, for example, the cache server 1001-1, uses a URL contained in a content request that is received from the client terminal 1002-1 or 1002-2 as a key in searching the content database 1110, and judges whether or not it stores requested content.

Figure 13:
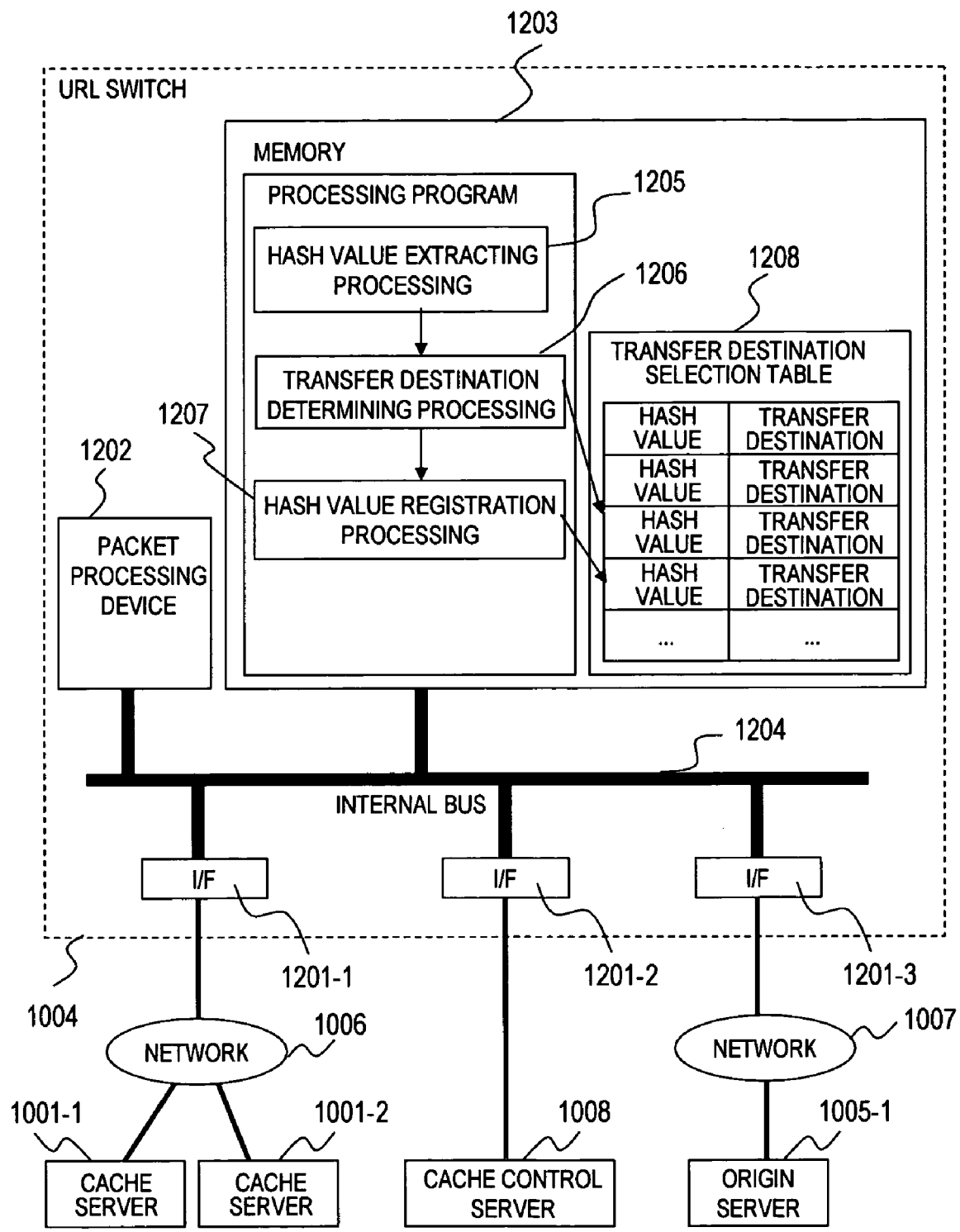
FIG. 13 is a block diagram of a URL switch according to the second embodiment.

FIG. 13 is a block diagram showing URL switch 1004 according to the second embodiment.

The URL switch 1004 is a computer that is equipped with a network interfaces 1201-1 to 1201-3, a packet processing device 1202, and a memory 1203. Those components are interconnected by an internal bus 1204.

The network interface 1201-1 is connected to the network 1006, the network interface 1201-2 is connected to the cache control server 1008, and the network interface 1201-3 is connected to the network 1007.

The packet processing device 1202 is a network processor for transferring an inputted packet to a given address.

The memory 1203 stores a processing program that contains a hash value extracting processing sub-program 1205, a transfer destination determining processing sub-program 1206, and a hash value registration processing sub-program 1207. The memory 1203 is provided with a buffer that temporarily stores packets sent and received by the URL switch 1004. The memory 1203 also stores a transfer destination selection table 1208.

The hash value extracting processing sub-program 1205 extracts a hash value from content requests sent by the client terminal 1002-1 and 1002-2. The transfer destination determining processing sub-program 1206 uses the hash value that is extracted by the hash value extracting processing sub-program 1205 as a key in searching the transfer destination selection table 1208 to determine a transfer destination of a content request. The hash value registration processing sub-program 1207 receives requests for registration and deletion of the hash value to the transfer destination selection table 1208.

The transfer destination selection table 1208 holds the association between a hash value and a transfer destination.

FIG. 14 is an explanatory diagram of a configuration of the transfer destination selection table 1208 according to the second embodiment.

The transfer destination selection table 1208 holds data of every cache in the cache servers within the computer system. Data in each entry of the transfer destination selection table 1208 is constituted of a hash value 12081 of a URL and a transfer destination IP address 12082 of a cache control server.

The URL hash value 12081 indicates a fixed-length hash value that is calculated from a URL designated by a content request. The transfer destination 12082 indicates the IP address of a cache control server that is associated with the URL from which the hash value is calculated. In other words, the transfer destination 12082 indicates the IP address of a cache control server to which the content request containing this hash value is transferred.

The URL switch 1004 uses a hash value contained in a content request that is received from the cache server 1001-1 or 1001-2 as a key in searching the transfer destination selection table 1208, and thus identifies to which cache control server the content request is to be transferred.

Figure 15:
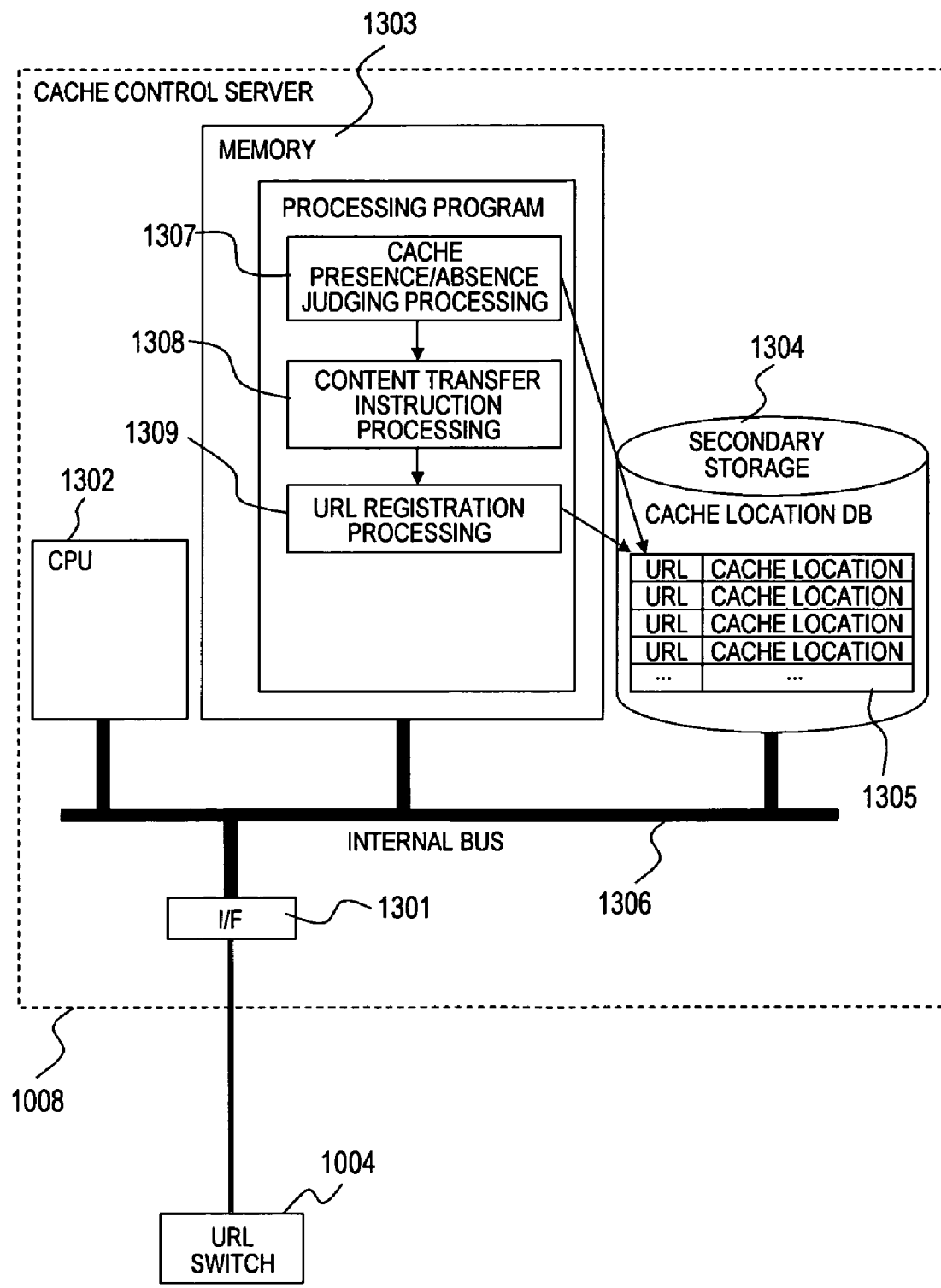
FIG. 15 is a block diagram of a cache control server according to the second embodiment.

FIG. 15 is a block diagram showing a configuration of the cache control server 1008 according to the second embodiment.

The cache control server 1008 is a computer that is equipped with a network interface 1301, a CPU 1302, a memory 1303, and secondary storage 1304. Those components are interconnected by an internal bus 1306.

The network interface 1301 is connected to the URL switch 1004.

The CPU 1302 executes various programs stored in the memory 1303 to control the control server.

The memory 1303 stores a processing program that contains a cache presence/absence judging processing sub-program 1307, a content transfer instruction processing sub-program 1308, and a URL registration processing sub-program 1309.

The cache presence/absence judging processing sub-program 1307 extracts a URL from a content request packet that is sent by the URL switch 1004, searches a cache location database 1305, and determines which cache server holds a relevant cache.

The content transfer instruction processing sub-program 1308 instructs the cache server that holds the relevant cache to transfer the requested content.

The URL registration processing sub-program 1309 registers in the cache location database 1305 information on content that is obtained by the cache servers 1001-1 and 1001-2.

The secondary storage 1304 is a hard disk drive that keeps stored data after the proxy server 103 is powered off, and stores the cache location database 1305.

The cache location database 1305 holds the association between a cache location and the URL of the cache location.

FIG. 16 is an explanatory diagram of a configuration of the cache content database 1305 according to the second embodiment.

The cache location database 1305 contains a URL 13051 and an IP address 13052 of a cache server that stores a cache.

The URL 13051 indicates a URL at which requested content is stored in an origin server. The cache server 13052 indicates the IP address of a cache server that stores the requested content. The cache control server 1008 uses a URL contained in a content request that is received from the cache server 1001-1 or 1001-2 as a key in searching the cache location database 1305, and determines which cache server stores requested content.

Figure 18:
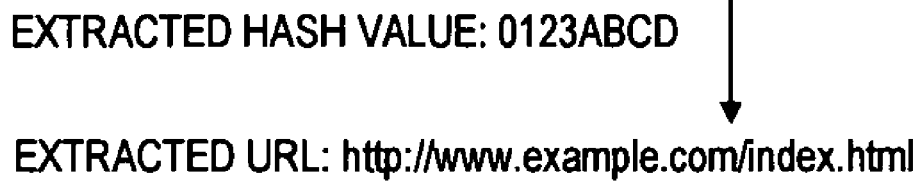
FIG. 18 is an explanatory diagram of a content request packet that is sent from the cache server according to the second embodiment.

FIG. 17 and FIG. 18 are explanatory diagrams of content request packets according to the second embodiment.

FIG. 17 shows a content request packet that is sent from the client terminal 1002-1. This content request packet contains the URL of requested content.

The cache server 1001-1 receives a content request packet from the client terminal 1002-1, and extracts a URL from the received packet. To be specific, the cache server 1001-1 extracts "http://www.example.com/" from a Referrer header, and "index.html" from a GET header. The cache server 1001-1 combines the two to obtain a complete URL "http://www.example.com/index.html".

FIG. 18 shows a content request packet that is sent from the cache server 1001-1.

A content request packet sent from the cache server 1001-1 is obtained by attaching an X-Hash header to the content request packet shown in FIG. 17, namely, a content request packet sent from the client terminal 1002-1. A hash value (for example, 0123ABCD) of a URL contained in the packet is stored in the X-Hash header.

Receiving the content request packet, the URL switch 105 extracts the hash value from the X-Hash header to determine a transfer destination of the content request packet.

The cache control server 1008 receives the content request packet that is sent from the cache server 1001-1, and extracts the URL from the received packet, obtaining "http://www.example.com/index.html".

A procedure of requesting content will be described next.

Figure 19:
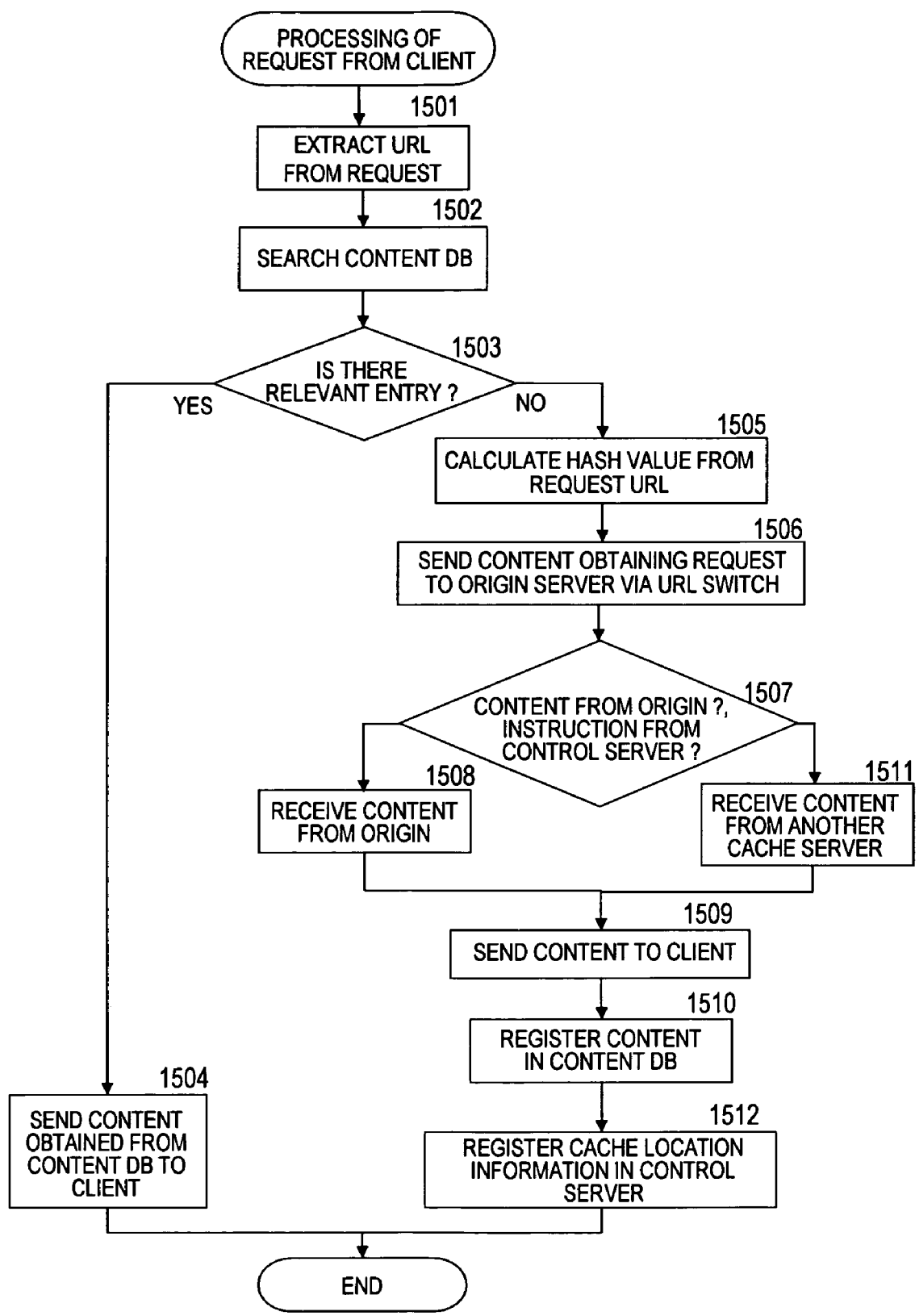
FIG. 19 is a flow chart for content requesting processing that is executed by the cache server according to the second embodiment.

FIG. 19 is a flow chart for content requesting processing that is executed by the cache server 1001-1 according to the second embodiment.

The cache server 1001-1 first receives from the client terminal 1002-1 a content request packet as the one shown in FIG. 17, and extract a content URL contained in the content request packet (Step 1501). Using the extracted URL as a key, the cache server 1001-1 searches the content database 1110 (Step 1502) and judges whether or not the content database 1110 holds the requested content (Step 1503).

When the content requested by the client terminal 1002-1 are found in the content database 1110, the cache server 1001-1 obtains the content from the content database 11110, and sends the obtained content to the client terminal 1002-1 (Step 1504).

On the other hand, when the requested content is not found in the content database 1110, the cache server 1001-1 uses the hash value calculation processing sub-program 1107 to calculate a hash value from the URL of the requested content (Step 1505). The cache server 1001-1 creates a content request packet that stores in its header (X-Hash header) the calculated hash value, and sends the created content request packet to the origin server 1005-1 (Step 1506). This content request is sent via the URL switch 1004.

There are two possible responses to this content request. One is as content transferred from the origin server 1005-1. In this case, the cache server 1001-1 receives the content from the origin server 1005-1 (Step 1508).

The other is as content transferred from the other cache server. In this case, the cache server 1001-1, which is the sender of the request, receives from the cache control server 1008 a message informing that the requested content is sent from the other cache server 1001-2, and then receives the content from the other cache server 1001-2 (Step 1511).

The cache server 1001-1, which is the sender of the request, transfers the received content to the client terminal 1002-1

(Step 1509). The content is registered in the content database 1110 (Step 1510). After that, a message informing that content is added to this cache server is sent to the cache control server 1008 (Step 1512).

Figure 20:
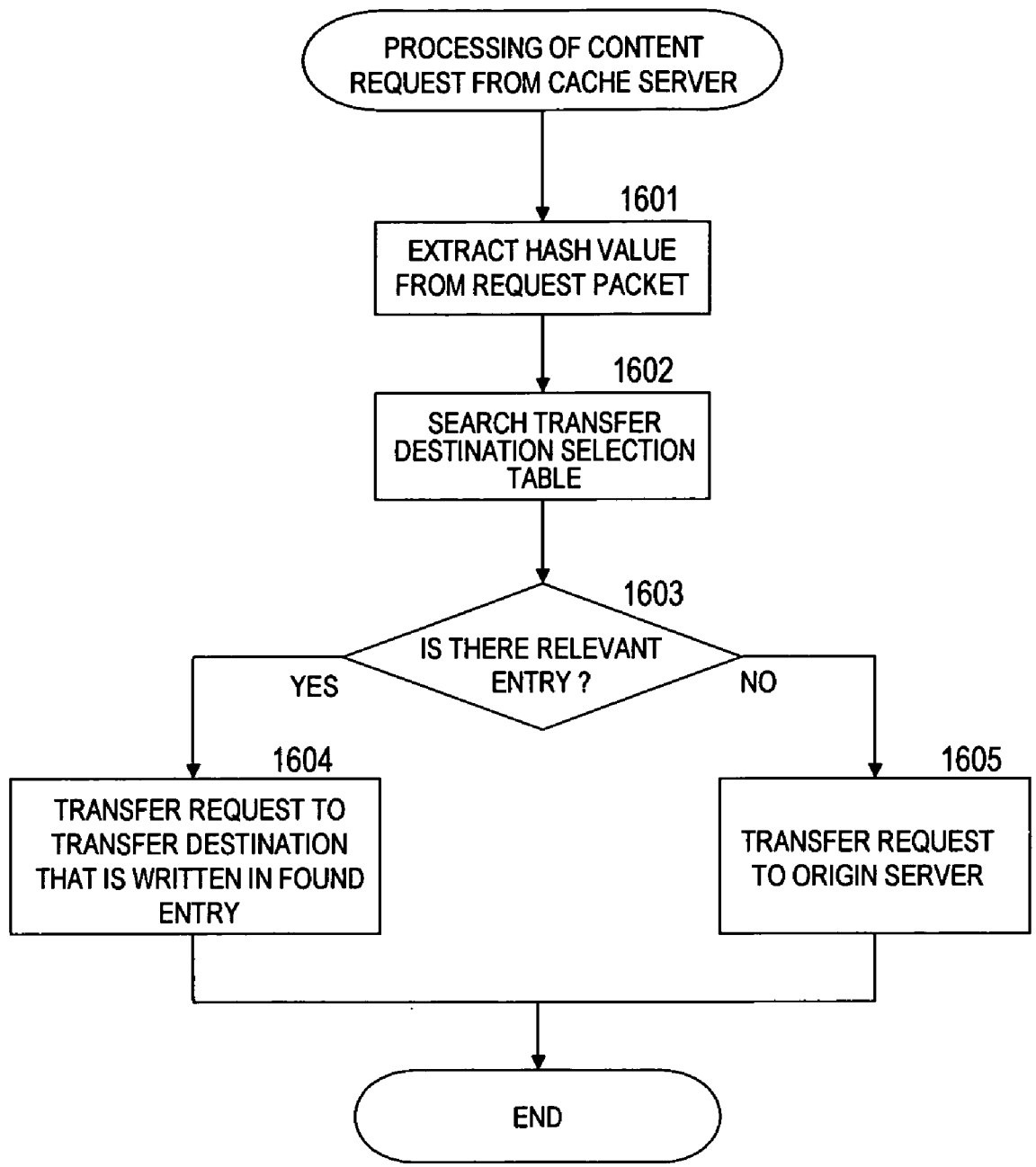
FIG. 20 is a flow chart for content requesting processing that is executed by the URL switch according to the second embodiment.

FIG. 20 is a flow chart for content requesting processing that is executed by the URL switch 1004 according to the second embodiment.

The URL switch 1004 is placed between the cache server 1001-1 and the origin server 1005-1. This enables the URL switch 1004 to capture a content request packet that is sent from the cache server 1001-1 to the origin server 1005-1 as the one shown in FIG. 18.

Catching a content request packet sent from the cache server 1001-1 toward the origin server 1005, the URL switch 1004 extracts a hash value of a URL from the captured packet (Step 1601). Using the extracted hash value as a key, the URL switch 1004 searches the transfer destination selection table 1208 (Step 1602), and judges whether or not the transfer destination selection table 1208 has a relevant entry (Step 1603).

When the relevant entry is found in the transfer destination selection table 1208, it means that requested server content is in one of the cache servers. The URL switch 1004 determines a control server that is written in the found entry as the transfer destination, and transfers the content request packet to the control server determined (Step 1604).

When the relevant entry is not found in the transfer destination selection table 1208, it means that none of the cache servers has requested server content. Then, the URL switch 1004 transfers the content request packet to the origin server 1005-1 (Step 1605). Since the content request packet sent from the cache server 1001-1 is directed to the origin server 1005-1, the URL switch 1004 does not need to obtain the IP address of the origin server 1005-1.

Figure 21:
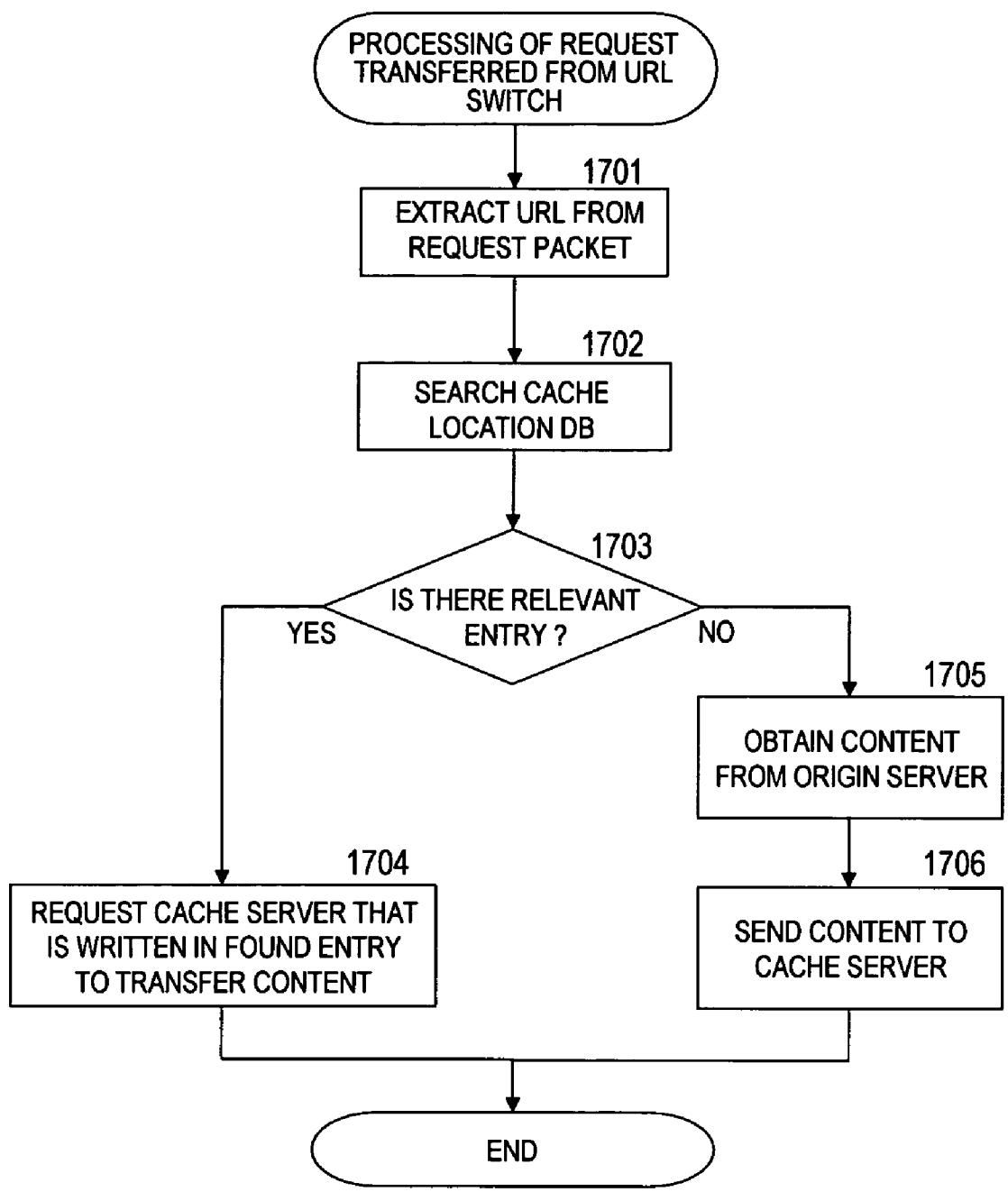
FIG. 21 is a flow chart for content requesting processing that is executed by the cache control server according to the second embodiment.

FIG. 21 is a flow chart for content requesting processing that is executed by the cache control server 1008 according to the second embodiment.

The cache control server 1008 receives a content request packet transferred from the URL switch 1004, and extracts the URL of requested content from the content request packet (Step 1701). Using the extracted URL as a key, the cache control server 1008 searches the cache location database 1305 (Step 1702), and judges whether or not the cache location database 1305 has a relevant entry (Step 1703).

When the cache location database 1305 has an entry for the extracted URL, it means that the requested content is in a cache server that is not the one requesting content. The control server 1008 sends to the cache server 1001-1, which is the sender of the request, a message informing that the requested content is transferred from the other cache server, 1001-2. The cache control server 1008 then chooses the cache server 1001-2 written in the found entry, and instructs the cache server 1001-2 to transfer the content located at the extracted URL to the cache server 1001-1 which is the sender of the request (Step 1704).

When the cache location database 1305 does not have an entry for the extracted URL, it means that the URL switch 1004 has made an erroneous judgment about the presence or absence of the relevant cache. If it is the case, there is a possibility of hash value confliction since the URL switch 1004 judges whether there is a cache or not from a hash value.

Accordingly, the cache location database 1305 does not have the relevant entry, the cache control server 1008 transfers the content request packet to the origin server 1005-1 and obtains the requested content (Step 1705).

The cache control server 1008 sends the content obtained from the origin server 1005-1 to the cache server 1001-1 which is the sender of the request (Step 1706). The cache server 1001-1 which is the sender of the request transfers the received content to the client terminal 1002-1, and stores the content as a cache.

Figure 22:
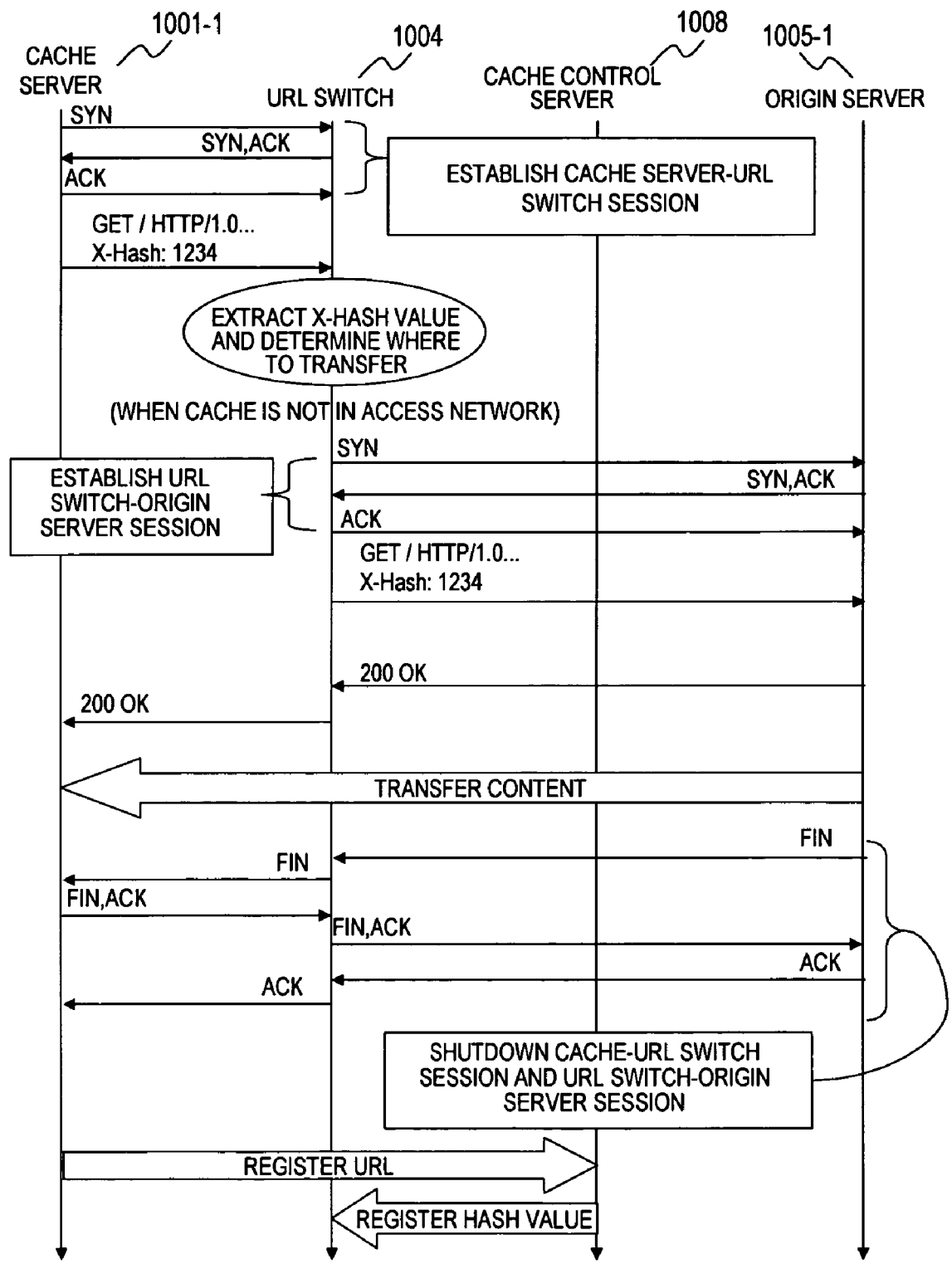
FIG. 22 is a sequence diagram of content transfer according to the second embodiment.
Figure 23:
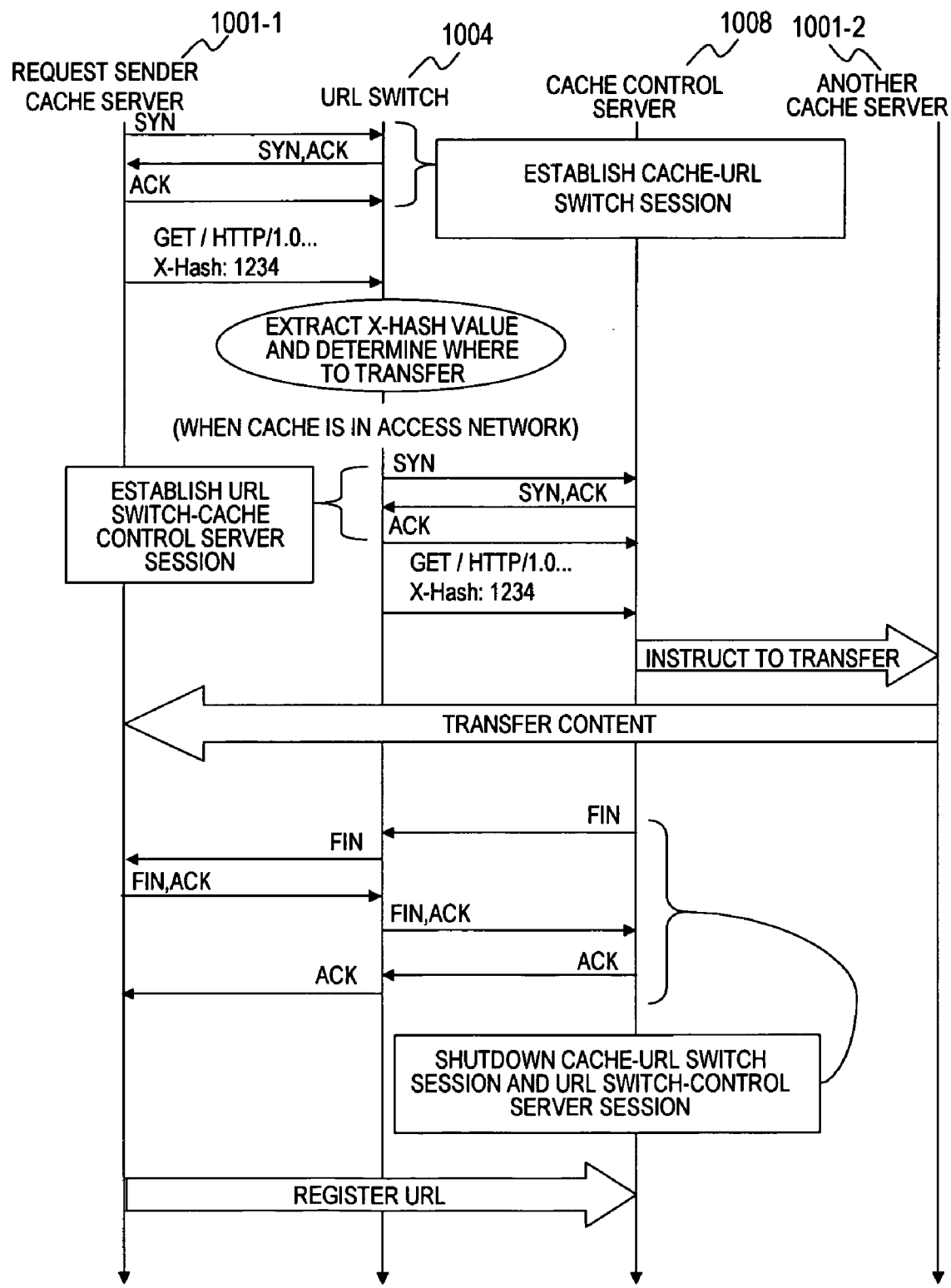
FIG. 23 is a sequence diagram of content transfer according to the second embodiment.

FIG. 22 and FIG. 23 are sequence diagrams of content transfer according to the second embodiment.

FIG. 22 shows a sequence of when content requested by a cache server are not found in any of the cache servers.

The cache server 1001-1 receives a content request packet from the client terminal 1002-1 and performs a TCP 3-way handshake in order to establish a session with the URL switch 1004.

To be specific, the cache server 1001-1 sends a SYN packet to the URL switch 1004 requesting the URL switch 1004 to establish a session between the cache server 1001-1 and the URL switch 1004. Receiving the SYN packet, the URL switch 1004 sends a SYN packet and an ACK packet to the cache server 1001-1 when it is possible to establish the session. In response to the SYN and ACK packets, the cache server 1001-1 sends an ACK packet. The session between the cache server 1001-1 and the URL switch 1004 is established through this packet exchange.

The cache server 1001-1 then adds an X-Hash value of a URL to the content request packet received from the client terminal 1002-1 and sends the packet to the URL switch 1004 (Step 1506 of FIG. 19). The URL switch 1004 extracts the hash value from the received content request packet (Step 1601 of FIG. 20), and determines a transfer destination of the packet (Step 1602 of FIG. 20).

Since the transfer destination selection table 1208 does not have the relevant entry (none of the cache servers has the requested content) in the example of FIG. 22, the URL switch 1004 transfers the content request packet to the origin server 1005, in this example, the origin server 1005-1. To transfer the content request packet, a session is established between the URL switch 1004 and the origin server 1005-1. The URL switch 1004 sends the content request packet from the client terminal 1002-1 to the origin server 1005-1 with which the session has been established (Step 1605 of FIG. 20).

Receiving the content request packet, the origin server 1005-1 sends an OK packet. The URL switch 1004 transfers the OK packet sent from the origin server 1005-1 to the cache server 1001-1. The origin server 1005-1 sends the requested content.

After finishing the transmission of the requested content, the origin server 1005-1 sends a FIN packet. The URL switch 1004 transfers the FIN packet sent by the origin server 1005-1 to the cache server 1001-1.

Receiving the FIN packet, the cache server 1001-1 ends the session with the origin server 1005-1, and sends a FIN packet and an ACK packet. The origin server 1005-1 receives the FIN and ACK packets, and sends an ACK packet in return. The session between the cache server 1001-1 and the origin server 1005-1 is ended through this packet exchange.

After that, the cache server 1001-1 sends the URL of the transferred content to the cache control server 1008. The cache control server 1008 adds the received URL to the cache location database 1305.

The cache control server 1008 calculates a hash value of the received URL and sends the calculated hash value to the URL switch 1004. The URL switch 1004 adds the received hash value to the transfer destination selection table 1208 in a manner that associates the hash value with the cache control server 1008 that has calculated this hash value.

FIG. 23 shows a sequence of when a cache server that is not the one requesting content stores the requested content.

The cache server 1001 that requests content, in this example, the cache server 1001-1, receives a content request packet from the client terminal 1002, and performs a TCP 3-way handshake in order to establish a session with the URL switch 1004. This step is the same as the one shown in FIG. 22.

The cache server 1001-1 which is the sender of the request adds an X-Hash value of a URL to the content request packet received from the client terminal 1002-1 and sends the packet to the URL switch 1004 (Step 1506 of FIG. 19). The URL switch 1004 extracts the hash value from the received content request packet (Step 1601 of FIG. 20), and determines a transfer destination of the packet (Step 1602 of FIG. 20).

Since the transfer destination selection table 1208 has the relevant entry (the requested content is in one of the cache servers) in the example of FIG. 23, the URL switch 1004 obtains the content from the other cache server 1001-2. To obtain the content, a session is established between the URL switch 1004 and the cache control server 1008. The URL switch 1004 sends the content request packet from the client terminal 1002-1 to the cache control server 1008 (Step 1604 of FIG. 20).

Receiving the content request packet, the cache control server 1008 searches the cache location database 1305 to identify the cache server 1001-2 as the cache server storing the requested content (Step 1702 of FIG. 21). The cache control server 1008 then instructs the identified cache server 1001-2 to transfer the content (Step 1704 of FIG. 21).

The cache server 1001-2, which stores the requested content, sends the content to the cache server 1001-1, which is the sender of the request.

After the transmission of the requested content is completed, the cache control server 1008 sends a FIN packet. The URL switch 1004 transfers the FIN packet sent by the cache control server 1008 to the cache server 1001-1.

Receiving the FIN packet, the cache server 1001-1 ends the session with the cache control server 1008, and sends a FIN packet and an ACK packet. The cache control server 1008 receives the FIN and ACK packets, and sends an ACK packet in return. The session between the cache server 1001-1 and the cache control server 1008 is ended through this packet exchange.

After that, the cache server 1001-1 sends the URL of the transferred content to the cache control server 1008. The cache control server 1008 adds the received URL to the cache location database 1305.

As described above, in the second embodiment, the URL switch 1004 uses a hash value of a URL in determining a transfer destination. Thus the load born by the cache control server 1008 in prior art is shifted to the URL switch 1004 and the cache control server 1008 is offloaded.

In addition, the processing load of the URL switch 1004 is lessened since the cache server 1001-1 obtains a hash value of a URL and the URL switch 1004 uses the hash value in judging whether there is a cache or not. Also, the second embodiment simplifies processing of the URL switch 1004 as in the first embodiment by making the URL switch 1004 extract a hash value instead of a URL.

Third Embodiment

In the first and second embodiments, a hash value is buried in a packet that is exchanged after a session is established between a server and a client terminal. A third embodiment described below uses a packet in which a hash value is buried when a TCP session is established.

Figure 24:
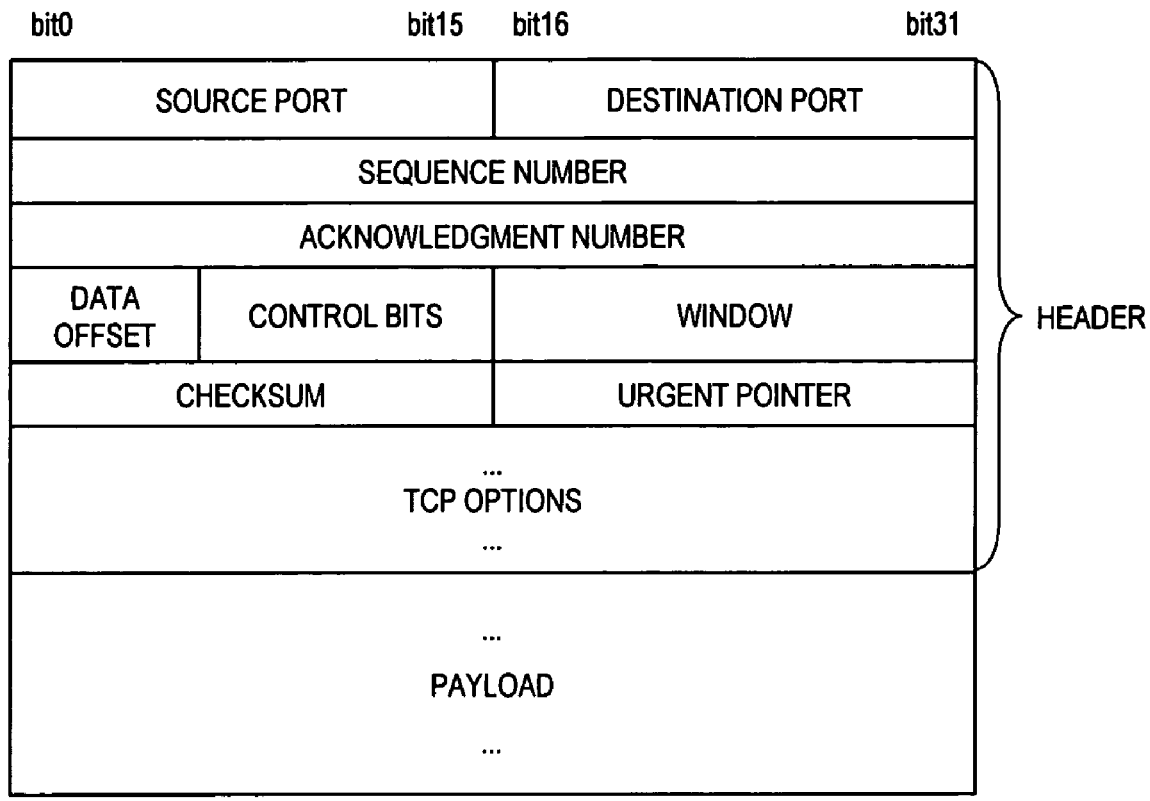
FIG. 24 is an explanatory diagram of a TCP header format according to a third embodiment.
Figure 24:

FIG. 24 is an explanatory diagram of a TCP header format according to the third embodiment.

A packet transmitted when a TCP session is established has a SYN flag set in a TCP header control bits to indicate that the packet is a request to establish a session. In the third embodiment, a hash value of a URL at which requested content is located is buried in TCP options of the SYN packet.

It is therefore necessary in implementing the third embodiment to modify an existing TCP stack that is installed to a client terminal. Accordingly, which one of the method of the first and second embodiments and the method of the third embodiment is employed should be determined in accordance with the use.

The third embodiment is applicable to both the computer system of the first embodiment shown in FIG. 1 and the computer system of the second embodiment shown in FIG. 10.

Described next is a content requesting procedure of when the third embodiment is applied to the computer system of the first embodiment shown in FIG. 1.

Figure 25:
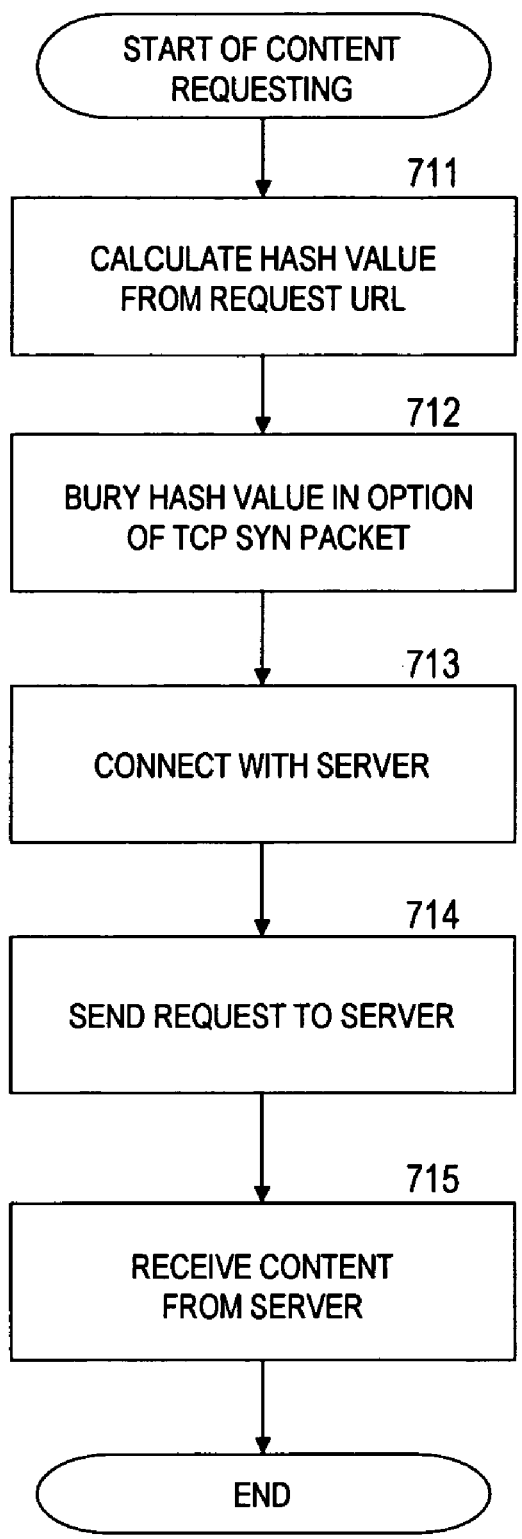
FIG. 25 is a flow chart for content requesting processing that is executed by a client terminal according to the third embodiment.

FIG. 25 is a flow chart for content requesting processing that is executed by the client terminal 101-1 according to the third embodiment.

Once a URL at which requested content is located is determined, the client terminal 101-1 calculates a hash value of the URL (Step 711).

The client terminal 101-1 stores the calculated hash value in TCP options of a TCP SYN packet to create a SYN packet (Step 712).

The client terminal 101-1 sends the SYN packet containing the hash value of the URL, and establishes a session with the web server 104-1 (Step 713).

The client terminal 101 then sends the content request packet to the URL switch 105 (Step 714). The client terminal 101 receives the requested content via the URL switch 105 from the Web server 104-1 (Step 715).

Figure 26:
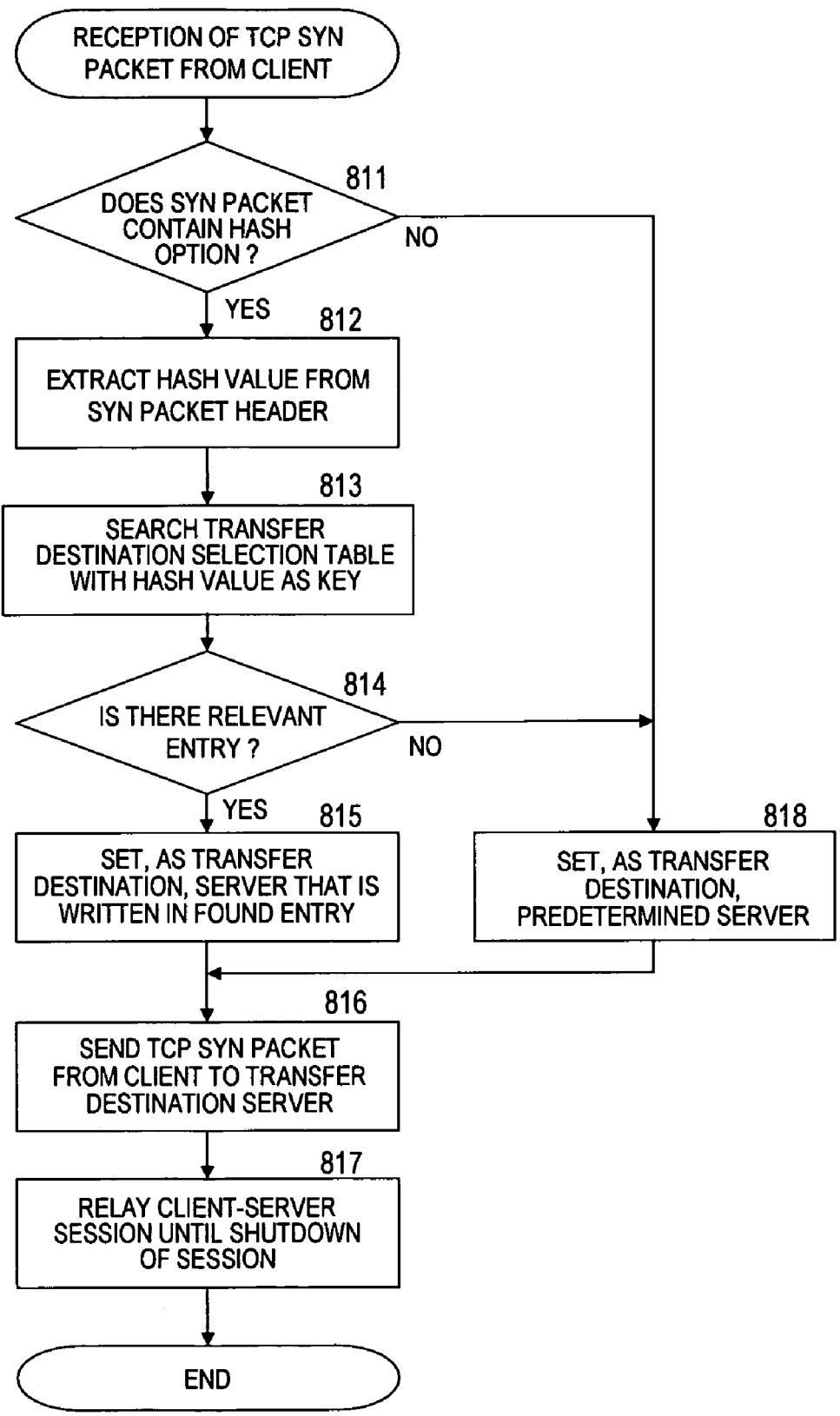
FIG. 26 is a flow chart for session relaying processing which is executed by a URL switch according to the third embodiment.

FIG. 26 is a flow chart for session relaying processing which is executed by the URL switch 105 according to the third embodiment. The URL switch 105 executes the session relaying processing upon receiving a TCP SYN packet from the client terminals 101-1 to 101-n.

The URL switch 105 receives a SYN packet from the client terminal 101, for example, the client terminal 101-1, and judges whether or not the SYN packet contains a hash value (Step 811).

When a hash value is found in the SYN packet, the URL switch 105 extracts the hash value from the SYN packet (Step 812).

With the extracted hash value as a key, the URL switch 105 searches the transfer destination selection table 407 (Step 813) and judges whether or not the table has a relevant entry (Step 814).

When the relevant entry is found in the transfer destination selection table 407, the URL switch 105 determines as the transfer destination the Web server 104 that is written in the found entry, for example, the Web server 104-1 (Step 815).

The URL switch 105 transfers the SYN packet from the client terminal 101-1 to the transfer destination, which is the Web server 104-1, and establishes a session between the client terminal 101-1 and the Web server 104-1 (Step 816).

The URL switch 105 relays the session between the client terminal 101-1 and the Web server 104-1 until the session is shut down (Step 817).

When the SYN packet does not contain a hash value in Step 811, or when a relevant entry is not found in Step 814, the URL switch 105 designates a Web server that is determined in advance, for example, the Web server 104-1, as the transfer destination, and establishes a session with this Web server (Step 818). The URL switch 105 then sends the content request made by the client terminal 101-1 to the transfer destination server, the Web server 104-1, and establishes a session between the client terminal 101-1 and the Web server 104-1 (Step 816).

Figure 27:
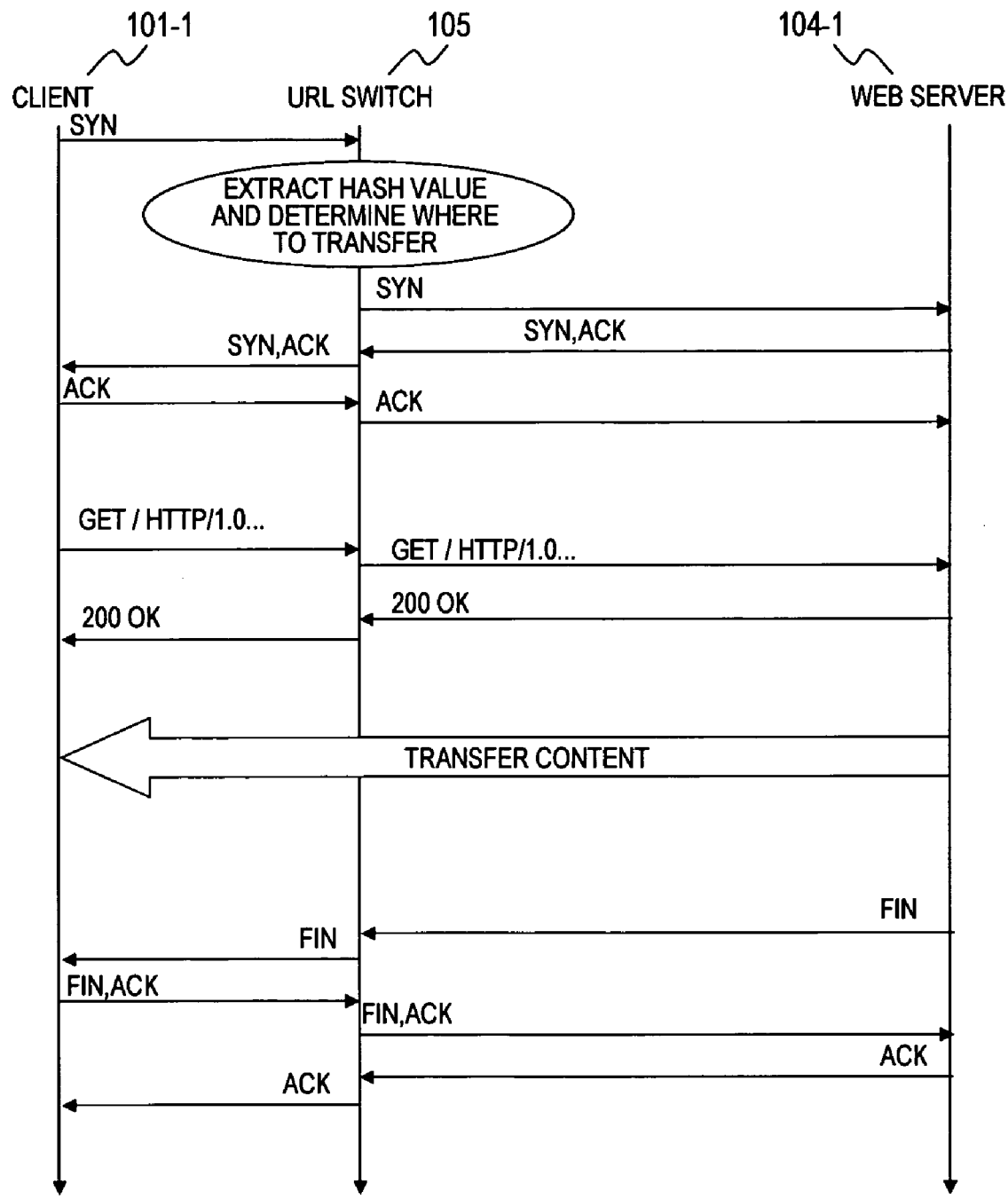
FIG. 27 is a sequence diagram for content transfer according to the third embodiment.

FIG. 27 is a sequence diagram of content transfer according to the third embodiment.

The client terminal 101-1 performs a TCP 3-way handshake in order to establish a session with the Web server 104-1.

To be specific, the client terminal 101-1 sends to the Web server 104-1 a SYN packet containing a hash value of a URL (Step 713 of FIG. 25). The URL switch 105 captures the SYN packet sent from the client terminal 101-1 and destined to the Web server 104-1.

The URL switch 105 extracts the hash value from the captured SYN packet (Step 812 of FIG. 26), and determines a transfer destination of the SYN packet (Steps 813 to 815 and Step 818 of FIG. 26). The URL switch 105 sends the SYN packet to the server determined as the transfer destination (Step 816 of FIG. 26), and requests a session be established between the client terminal 101-1 and the URL switch 105.

The URL switch 105 subsequently relays packets exchanged between the client terminal 101-1 and the transfer destination server.

The Web server 104-1 receives the SYN packet and, when it is possible to establish the session, sends a SYN packet and an ACK packet to the client terminal 101-1. In response to the SYN and ACK packets, the client terminal 101-1 sends an ACK packet. The session between the client terminal 101-1 and the URL switch 105 is established through this packet exchange.

The client terminal 101-1 then sends a content request packet. The URL switch 105 transfers the received content request packet to the Web server 104-1 with which the session has been established.

Receiving the content request packet, the Web server 104-1 sends an OK packet. The URL switch 105 transfers the OK packet sent from the Web server 104-1 to the client terminal 101-1. The Web server 104-1 sends the requested content.

After finishing the transmission of the requested content, the Web server 104-1 sends a FIN packet. The URL switch 105 transfers the FIN packet sent by the Web server 104-1 to the client terminal 101-1.

Receiving the FIN packet, the client terminal 101-1 ends the session with the Web server 104-1, and sends a FIN packet and an ACK packet. The Web server 104-1 receives the FIN and ACK packets, and sends an ACK packet in return. The session between the client terminal 101-1 and the Web server 104-1 is ended through this packet exchange.

As described above, in the third embodiment, a hash value of a URL at which requested content is located is buried in a TCP option string of a SYN packet. The URL switch 105 can thus determine, from the hash value in the TCP option string, a stream transfer destination server at the time a session is established.

In addition, TCP header analysis is even simpler than extraction of a hash value contained in data in a TCP stream. Accordingly, processing in the URL switch 105 is further simplified.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising a plurality of servers, and a packet transfer device,
   wherein the servers are coupled to the packet transfer device,
   wherein the packet transfer device is coupled to a client terminal via a network,
   wherein the packet transfer device: receives a content request including a fixed-length hash value that is calculated from a variable-length identifier of the content requested by the client terminal,
   wherein the packet transfer device extracts the hash value from the received content request, and
   wherein the packet transfer device determines, based on the extracted hash value, to which one of the plurality of servers the content request is to be transferred.

2. The computer system according to claim 1, further comprising:
   the client terminal,
   wherein the client terminal calculates a fixed-length hash value from the variable-length identifier of the requested content, stores the calculated hash value in the content request, and sends the content request to the packet transfer device.

3. The computer system according to claim 1, further comprising:
   a proxy server for receiving a content request from the client terminal,
   wherein the proxy server is coupled to the packet transfer device and to the client terminal,
   wherein the client terminal sends, to the proxy server, a content request that includes a variable-length identifier of requested content, and
   wherein the proxy server extracts, from the received content request, the variable-length identifier of the requested content, calculates a fixed-length hash value from the extracted identifier, stores the calculated hash value in the content request, and sends the content request to the packet transfer device.

4. The computer system according to claim 3, wherein the proxy server comprises:
   an interface unit for receiving the content request from the client terminal; and
   a processor for calculating a fixed-length hash value from the variable-length identifier of the requested content and storing the calculated hash value in the content request.

5. The computer system according to claim 1, wherein the client terminal comprises:
   a processor for calculating a fixed-length hash value from the variable-length identifier of the requested content and writing the calculated hash value in a content request packet.

6. The computer system according to claim 1, wherein the packet transfer device comprises:
   a processor for extracting a fixed-length hash value that is included in the content request; and
   storage unit for storing transfer destination selection information, which includes correspondence between the hash value calculated from the variable-length content identifier and a transfer destination of the content request.

7. The computer system according to claim 6, wherein the processor determines a transfer destination of the content request based on the extracted hash value and the transfer destination selection information, and transfers the content request to the determined transfer destination.

8. The computer system according to claim 6, wherein the processor extracts the hash value from an HTTP header.

9. The computer system according to claim 6, wherein the processor extracts the hash value from a session establishment requesting packet.

10. The computer system according to claim 1, whereine the packet transfer device receives, instead of the content request, a session establishment request including a fixed-length hash value that is calculated from a variable-length identifier of content requested by the client terminals, and wherein the packet transfer device extracts the hash value from the received session establishment request, and determines, based on the extracted hash value, to which one of the plurality of servers the session establishment request is to be transferred.

11. A computer system, comprising:

a packet transfer device;

an origin server;

a cache server; and a control server, wherein the origin server provides content to a client terminal, wherein the cache server stores content provided by the origin server, wherein the control server manages the content stored in the cache server, wherein the packet transfer device receives a content request including a fixed-length hash value that is calculated from a variable-length identifier of the content requested by the client terminal, and wherein the packet transfer device allocates the content request to the origin server or the cache server based on the hash value that is included in the received content request.

12. The computer system according to claim 11, wherein the control server has cache location information which includes information of content stored in the cache server.

13. The computer system according to claim 11, wherein the cache server comprises:

an interface for receiving a content request from the client terminal; and a processor for calculating a fixed-length hash value from a variable-length identifier of requested content and storing the calculated hash value in the content request.

* * * * *